United States Patent
Sasami

(10) Patent No.: US 9,183,470 B2
(45) Date of Patent: Nov. 10, 2015

(54) IMAGE FORMING APPARATUS, SYSTEM, AND METHOD FOR HANDLING RETENTION SHEETS

(71) Applicant: Konica Minolta, Inc., Tokyo (JP)

(72) Inventor: Shingo Sasami, Hino (JP)

(73) Assignee: KONICA MINOLTA, INC., Tokyo (JP)

( * ) Notice: Subject to any disclaimer, the term of this patent is extended or adjusted under 35 U.S.C. 154(b) by 0 days.

(21) Appl. No.: 14/169,267

(22) Filed: Jan. 31, 2014

(65) Prior Publication Data

US 2014/0218755 A1 Aug. 7, 2014

(30) Foreign Application Priority Data

Feb. 1, 2013 (JP) .................................. 2013-018608

(51) Int. Cl.
| | |
|---|---|
| G06K 15/16 | (2006.01) |
| B41J 11/00 | (2006.01) |
| B41J 13/00 | (2006.01) |
| G03G 15/00 | (2006.01) |

(52) U.S. Cl.
CPC ............... G06K 15/16 (2013.01); B41J 11/006 (2013.01); B41J 13/0009 (2013.01); G03G 15/5012 (2013.01); G03G 15/70 (2013.01)

(58) Field of Classification Search
CPC .... G03G 15/5012; G03G 15/70; G06K 15/16
USPC .............. 358/1.12, 1.14, 1.15; 271/3.14, 264, 271/279, 298, 3.18, 3.19; 399/405, 66
See application file for complete search history.

(56) References Cited

U.S. PATENT DOCUMENTS

| | | | |
|---|---|---|---|
| 2006/0012645 A1* | 1/2006 | Nagashima ..................... 347/68 |
| 2006/0145414 A1* | 7/2006 | Yokobori et al. ........ 271/258.01 |
| 2007/0057445 A1* | 3/2007 | Miyake et al. ................ 271/256 |

(Continued)

FOREIGN PATENT DOCUMENTS

| | | |
|---|---|---|
| JP | 09025038 | 1/1997 |
| JP | 2005-335861 | 12/2005 |

(Continued)

OTHER PUBLICATIONS

Office Action dated Feb. 10, 2015 for the corresponding Japanese Patent Application No. 2013-018608.

(Continued)

*Primary Examiner* — Jacky X Zheng
(74) *Attorney, Agent, or Firm* — Lucas & Mercanti, LLP

(57) ABSTRACT

Disclosed is an image forming apparatus that includes an image forming section, a conveyance section, a position detecting section, an abnormality detecting section and a control section. When determining as the first determination that it is possible to eject each of the paper sheets and/or the image-formed paper sheets outside and determining as the second determination that it is necessary to re-output the new image-formed paper sheet, the control section incompletely ejects each of the retention paper sheets, remaining within the image forming apparatus, outside from the ejection opening. By controlling the apparatus as above-mentioned, even in a case where it is impossible to eject the concerned paper sheet onto a separate tray, it becomes possible to prevent the retention paper sheet from remaining at an apparatus-inner position, from which it is difficult for the user to remove the retention paper sheet concerned.

14 Claims, 11 Drawing Sheets

(56) References Cited

U.S. PATENT DOCUMENTS

2012/0105908 A1* 5/2012 Tsutsumi ............... 358/1.15
2013/0043647 A1* 2/2013 Fujii et al. ............... 271/226

FOREIGN PATENT DOCUMENTS

| JP | 2010-152087 | 7/2010 |
| JP | 2011-145558 | 7/2011 |
| JP | 2012-150523 | 8/2012 |
| JP | 2012234114 | 11/2012 |
| JP | 2012252101 | 12/2012 |

OTHER PUBLICATIONS

English translation of Office Action dated Feb. 10, 2015 for the corresponding Japanese Patent Application No. 2013-018608.

* cited by examiner

IMAGE FORMING APPARATUS, SYSTEM, AND METHOD FOR HANDLING RETENTION SHEETS

This application claims priority under 35 U.S.C. §119 to Japanese Patent Application No. 2013-18608 filed on Feb. 1, 2013, the entire disclosure of which is incorporated herein by reference in its entirety.

BACKGROUND OF THE INVENTION

1. Field of the Invention

The present invention relates to an image forming apparatus, an image forming system and an image forming control method, and specifically relates to a technology for appropriately handling a retention paper sheet when retention paper sheets, remaining within the apparatus or the system, have generated at the time when a certain abnormality has occurred.

2. Description of Related Art

When an abnormality, such as a paper jam, etc., has occurred at a certain position within an image forming apparatus, such as a copier, a printer, a facsimile apparatus, a printing machine, etc., operations of the image forming apparatus concerned is deactivated by controlling actions performed by a control section. Further, after deactivating the operations of the image forming apparatus concerned, the control section conducts controlling operations for implementing the purge processing. The purge processing is defined as such a technology for collecting plural retention paper sheets, currently remaining within the image forming apparatus, onto an ejecting tray disposed at a single position so as to collectively eject them.

Further, in a case where an image forming operation using a massive amount of paper sheets is implemented, the image forming operation is resumed from the page at which the concerned abnormality had occurred, after the abnormal paper sheet has been removed. On that occasion, successive to the final page outputted just before the occurrence of the abnormality, the page same as that at which the abnormality had occurred is to be outputted. Accordingly, it becomes possible not only to continuously implement the image forming operation as if the abnormality did not occurred, but also to prevent the paper sheets from being wasted.

In this connection, with respect to an operation for processing a abnormality, such as the paper jam as above-mentioned, etc., each of Japanese Patent Application Laid-Open Publication 2012-150523, Japanese Patent Application Laid-Open Publication 2011-145558, Japanese Patent Application Laid-Open Publication 2010-152087 and Japanese Patent Application Laid-Open Publication 2005-335861 sets forth various kinds of the related technologies.

In this connection, in order to resume the operation for forming images onto successive paper sheets after removing the abnormal paper sheets, it is necessary to discriminate the abnormal paper sheets, which are to be ejected from the image forming apparatus, and the subsequent normal paper sheets from each other, so as not to mingle them with each other. In other words, it is necessary to control the image forming apparatus to make the subsequent normal paper sheets, outputted after the occurrence of the abnormality, continue to the normal paper sheets, outputted before the occurrence of the abnormality concerned, so as not to yield a dropout paper sheet or duplicated paper sheets.

Japanese Patent Application Laid-Open Publication 2012-150523 above-cited sets forth such a devisal that the paper sheet is reversed after the occurrence/resolution of the abnormality, and outputted. However, according to this technology, only such a user who has grasped this function may be able to discriminate them from each other.

Further, according to the technology set forth in Japanese Patent Application Laid-Open Publication 2012-150523 above-cited, if the image forming operation is resumed without removing the abnormal paper sheets, it becomes difficult to discriminate the normal paper sheets and the abnormal paper sheets from each other. In addition, in a case of the single-side image forming operation, it is possible to recognize existence or non-existence of the reversed paper sheets, but in a case of the duplex image forming operation, it may become extremely difficult to determine whether or not the paper sheet concerned is reversed.

Still further, Japanese Patent Application Laid-Open Publication 2011-14558 above-cited proposes that, when the operation for manually removing the abnormal (or jammed) paper sheet is faster than the automatic removing operation therefor, the automatic removing operation, employing the purge processing, is disabled. However, the above-cited patent document fails to propose that the abnormal paper sheets and the subsequent paper sheets are discriminated from each other in the automatic removing operation so as not to mingle them with each other.

Still further, Japanese Patent Application Laid-Open Publication 2010-152087 above-cited proposes that the image-formed paper sheets, on which images are already formed, are ejected in such a manner that none of the page dropout exist even if a certain abnormality occurs. However, the above-cited patent document fails to propose that the abnormal paper sheets and the subsequent paper sheets are discriminated from each other in the automatic removing operation so as not to mingle them with each other.

Still further, Japanese Patent Application Laid-Open Publication 2005-335861 above-cited proposes that the retention paper sheets remaining at the time of jam occurrence is to be ejected onto the sub-tray. However, since Japanese Patent Application Laid-Open Publication 2005-335861 premises that a plurality of ejecting trays is provided in the apparatus, it is impossible to cope with above-mentioned feature in a case where only a single tray is provided in the apparatus concerned.

Yet further, even according to any one of the other conventional technologies concerned, all of the eject-able paper sheets are either to be ejected or to be retained. In other words, there has been such a problem that it is impossible to sufficiently cope with the operation for preventing the paper sheet from being duplicated, or the operation for preventing a retention paper sheet from remaining at a removing difficult position.

SUMMARY OF THE INVENTION

In general, according to one aspect of the present invention, an image forming apparatus comprise: an image forming section that forms an image onto a paper sheet; a conveyance section that conveys the paper sheet corresponding to an image forming operation, and ejects an image-formed paper sheet outside through an ejection opening; a position detecting section that detects a position of the paper sheet or the image-formed paper sheet, which is conveyed on a conveyance path of the conveyance section; an abnormality detecting section that detects an image abnormality in the image formed on the image-formed paper sheet or a conveyance abnormality in a conveying operation by the conveyance section; and a control section that controls the image forming operation and the conveying operation, based on results detected by the position detecting section and the abnormality detecting section, wherein the control section is configured to determine as a first determination whether or not it is possible for the conveyance section to eject each of retention paper sheets currently remaining within the image forming apparatus according to contents of the image abnormality and/or the conveyance abnormality and the position with respect to each of the retention paper sheets when the abnormality detecting section detects the image abnormality and/or the conveyance abnormality, to determine as a second determination whether or not it is necessary to form the image onto a new paper sheet so as to re-output a new image-formed paper sheet according to the contents of the image abnormality and/or the conveyance abnormality and the position with respect to each of the retention paper sheets when the abnormality detecting section detects the image abnormality and/or the conveyance abnormality, and to control the image forming operation and the conveying operation based on results of the first determination and the second determination, and wherein the control section conducts controlling operations for: deactivating an operation for conveying each of the retention paper sheets remaining within the image forming apparatus, when determining as the first determination that it is impossible to eject any one of the paper sheets and/or the image-formed paper sheets outside; ejecting each of the retention paper sheets, remaining within the image forming apparatus, outside through the ejection opening, when determining as the first determination that it is possible to eject each of the paper sheets and/or the image-formed paper sheets outside and determining as the second determination that it is unnecessary to re-output the new image-formed paper sheet; and incompletely ejecting each of the retention paper sheets, remaining within the image forming apparatus, outside from the ejection opening, when determining as the first determination that it is possible to eject each of the paper sheets and/or the image-formed paper sheets outside and determining as the second determination that it is necessary to re-output the new image-formed paper sheet.

Further, it is desirable that, when determining as the first determination that it is possible to eject each of the paper sheets and/or the image-formed paper sheets outside and determining as the second determination that it is necessary to re-output the new image-formed paper sheet, the control section controls the conveyance section so as to deactivate the conveying operation in such a state that each of the paper sheets and/or the image-formed paper sheets is ejected up to a mid-way position thereof from the ejection opening.

Still further, it is desirable that, when determining as the first determination that it is possible to eject each of the paper sheets and/or the image-formed paper sheets outside and determining as the second determination that it is necessary to re-output the new image-formed paper sheet, the control section controls the conveyance section so as to deactivate the conveying operation in such a state that only a leading paper sheet among the paper sheets and/or the image-formed paper sheets is ejected up to a mid-way position thereof from the ejection opening.

Still further, it is desirable that, in a case where it is possible to select one of plural ejection openings when ejecting the paper sheet or the image-formed paper sheet, when determining as the first determination that it is possible to eject each of the paper sheets and/or the image-formed paper sheets outside and determining as the second determination that it is necessary to re-output the new image-formed paper sheet, the control section controls the conveyance section so as to eject the image-formed paper sheet outside through an ejection opening that is not designated in regard to the image-formed paper sheet.

Still further, it is desirable that, according to contents of the image abnormality and/or the conveyance abnormality detected by the abnormality detecting section, the control section conducts controlling operations for temporarily deactivating the image forming operation to be implemented by the image forming section and the conveying operation to be implemented by the conveyance section.

Still further, it is desirable that, in a case where the abnormality detecting section detects the image abnormality, the control section conducts the controlling operations so as to deactivate the image forming operation to be implemented by the image forming section and the conveying operation to be implemented by the conveyance section, more rapidly than in a case where the abnormality detecting section detects the conveyance abnormality.

Yet further, in order to attain at least one of objects of the present invention, including the above-mentioned objects, the image forming system reflecting an aspect of the present invention is configured in the same manner as the above-mentioned image forming apparatus is configured. Further, in order to attain at least one of objects of the present invention, including the above-mentioned objects, the image forming control method, reflecting an aspect of the present invention, is controlled in the same manner as each of the image forming apparatus and the image forming system, both above-mentioned, is controlled.

BRIEF DESCRIPTION OF THE DRAWINGS

One or more embodiments of the present invention are shown by way of example, and not limitation, in the accompanying figures, in which.

DETAILED DESCRIPTION OF THE PREFERRED EMBODIMENT

Figure 1:
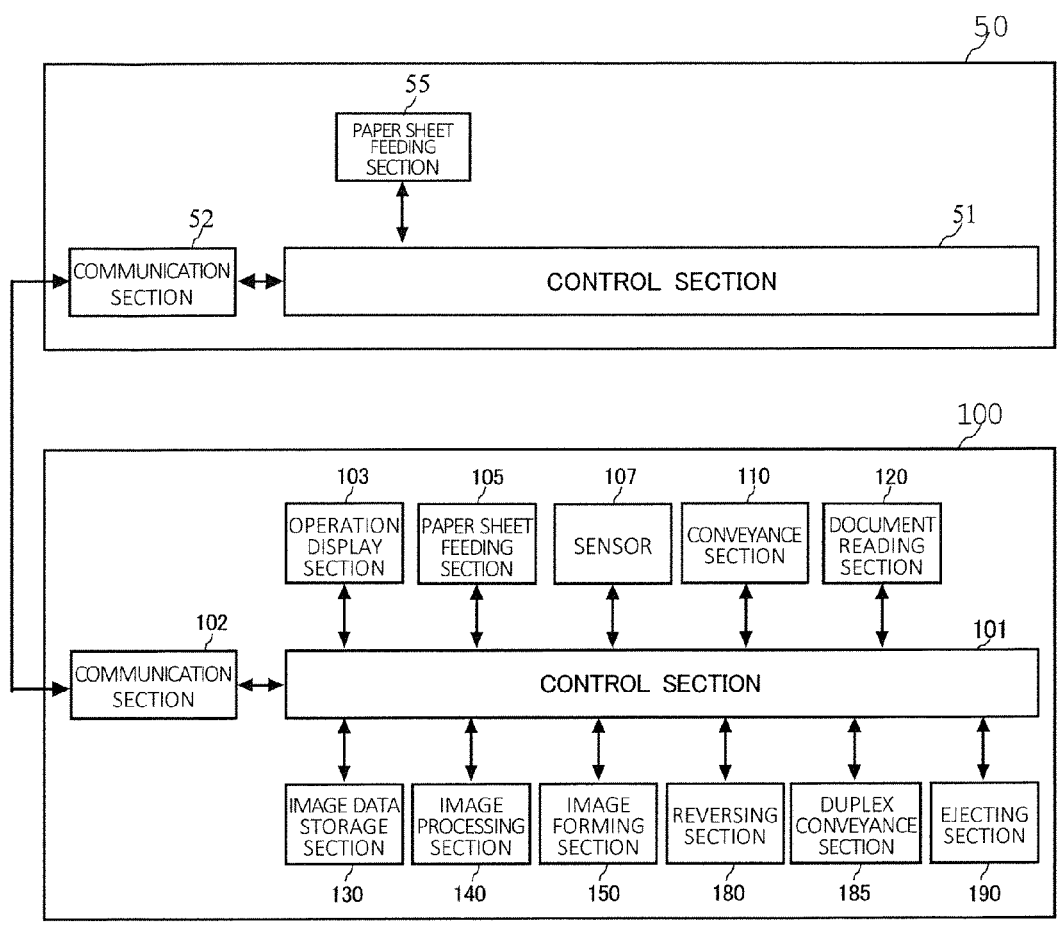
FIG. 1 is a schematic diagram showing a configuration of an embodiment in accordance with the present invention.

In the following paragraphs, one or more embodiments of the invention will be described by way of example and not limitation. It should be understood based on this disclosure that various other modifications can be made by those in the art based on these illustrated embodiments.

Referring to the drawings, embodiments in regard to an image forming apparatus, an image forming system and an image forming control method, each of which implements controlling operations for ejecting retention paper sheets in accordance with the present invention, will be detailed in the following.

<Configuration of Image Forming Apparatus>

Now, as the first example of the present embodiment, the configuration of the image forming apparatus that implements controlling operations for ejecting retention paper sheets will be detailed in the following, based on the schematic diagrams shown in FIG. 1 and FIG. 2.

Herein, a paper sheet feeding apparatus 50, an image forming apparatus 100 and a paper sheet processing apparatus 200 are arranged in accordance with a conveyance flow of a paper sheet. In this connection, the paper sheet feeding apparatus 50 feeds plural kinds of paper sheets, accommodated therein, to the image forming apparatus 100 as needed. The image forming apparatus 100 forms an image, represented by image data, onto each of the paper sheets. The paper sheet processing apparatus 200 applies various kinds of paper sheet processing to the paper sheet on which an image is formed, and then, ejects the processed paper sheet. In this connection, the various kinds of paper sheet processing include a punch processing, a center fold processing, a staple processing, etc.

Incidentally, various kinds of image forming apparatuses can serve as the image forming apparatus 100 embodied in the present invention. In the present embodiment, either an MFP (Multi-Functional Peripheral) that is provided with the functions of a scanner, a copier, a printer and a facsimile apparatus, or a Copier will be exemplified as a concrete example of the present invention to continue the explanations in the following. Further, explanations for generally well-known portions that do not directly relate to the operational and controlling features of the present embodiment as the image forming apparatus 100, will be omitted hereinafter in the present specification.

Referring to the schematic diagram shown in FIG. 1 and FIG. 2, the configuration of each of the apparatuses will be detailed in the following. The paper sheet feeding apparatus 50 is constituted by a control section 51, a communication section 52 and a paper sheet feeding section 55. In this connection, the control section 51 controls various kinds of sections provided in the paper sheet feeding apparatus 50. The communication section 52 has a function for communicating with other apparatuses coupled thereto. Further, as shown in FIG. 2, the paper sheet feeding section 55 feeds various kinds of paper sheets respectively accommodated into a plurality of paper sheet feeding sections 55a and 55b.

The image forming apparatus 100 is constituted by a control section 101, a communication section 102, an operation display section 103, a paper sheet feeding section 105, a sensor 107, a conveyance section 110, a document reading section 120, an image data storage section 130, an image processing section 140, an image forming section 150, a reversing section 180, a duplex conveyance section 185 and an ejecting section 190. In this connection, the control section 101 controls not only various kinds of sections provided in the image forming apparatus 100, but also overall operations of the system serving as the image forming system as a whole. The communication section 102 has a function for communicating with the other apparatuses coupled thereto.

The operation display section 103 accepts inputting operations conducted by the user and displays various kinds of screens indicating statuses of the image forming apparatus 100. The paper sheet feeding section 105 feeds paper sheets respectively accommodated into paper sheet feeding trays 105a through 105c, as shown in the schematic diagram shown in FIG. 2. Each of the sensors 107 serves as a position detecting section and/or an abnormality detecting section for detecting an abnormality in an image formed on the paper sheet and/or another abnormality in the conveyance state of the paper sheet, such as a deviation in a sub-scanning direction at the time of the conveyance operation, a conveyance delay at the time of the conveyance operation, etc.

The conveyance section 110 conveys paper sheets within the image forming apparatus 100. The document reading section 120 reads a document to create image data. The image data storage section 130 stores image data and various kinds of data, both of which are to be employed at the time of implementing an image forming operation. The image processing section 140 applies various kinds of image processing to image data, as needed. The image forming section 150 forms an image onto a paper sheet, based on an image forming command and the image data. The reversing section 180 reverses the paper sheet, onto which an image is already formed, as needed. The duplex conveyance section 185 conveys the paper sheet on an occasion that the duplex image forming operation is performed. The ejecting section 190 ejects the paper sheet onto an ejecting tray 190m.

In this connection, the image forming section 150 is constituted by an image bearing member 151, a charging unit 152, an exposing unit 153, a developing unit 154, a transferring unit 155 and a fixing unit 156. Herein, a toner image is formed on the image bearing member 151 by applying exposing and developing operations according to the image data, thereto. The charging unit 152 charges the surface of the image bearing member 151 up to a predetermined electric potential. The exposing unit 153 exposes light, modulated corresponding to the image data, onto the surface of the image bearing member 151, so as to form a latent image. The developing unit 154 develops the latent image formed on the image bearing member 151 with toner, so as to form a visible toner image thereon. The transferring unit 155 transfers the toner image, currently residing on the surface of the image bearing member 151, onto a paper sheet. The fixing unit 156 applies heat and pressure to the toner image, transferred on the paper sheet, so as to fix the toner image onto the paper sheet.

As the sensors 107, sensors 107sA, 107sB, 107sC, 107sD, 107sE, 107sF and 107sG, each of which serves as the position detecting section and/or the abnormality detecting section, are arranged along the conveyance section 110, the reversing section 180 and the duplex conveyance section 185. Each of this sensors 107 notifies the control section 101 of the detected result of detecting the abnormality in the image formed on the paper sheet and/or the other abnormality in the conveyance state of the paper sheet, such as a position in a sub-scanning direction at the time of the conveying operation (presence or absence of the deviation), a passing timing in a sub-scanning direction at the time of the conveying operation (presence or absence of the conveyance delay), etc.

Figure 2:
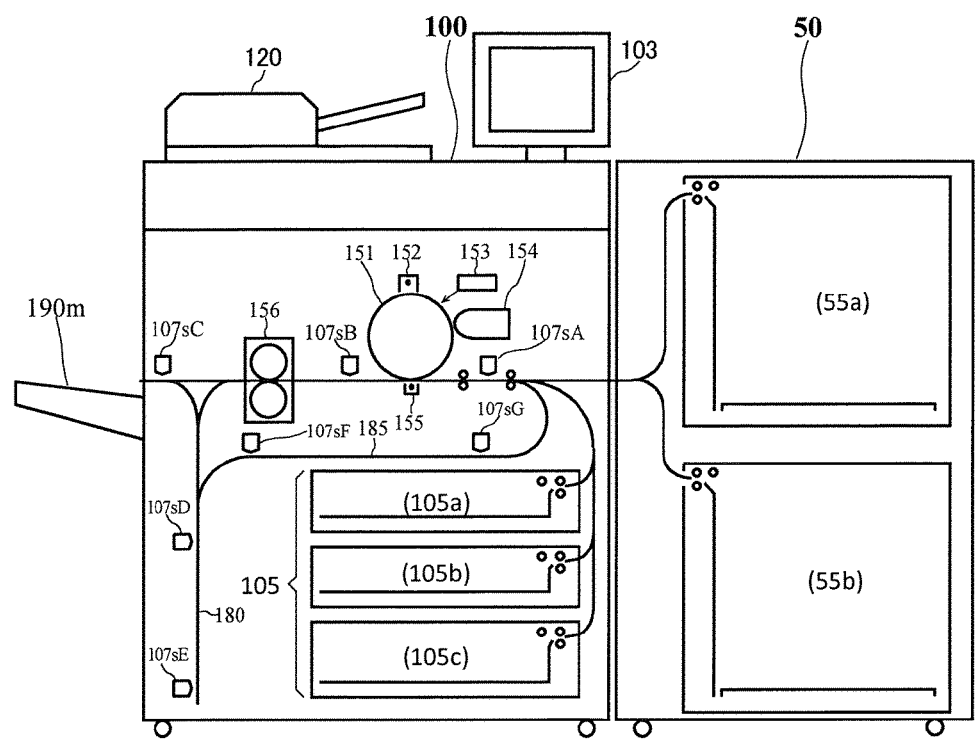
FIG. 2 is a schematic diagram showing a configuration of an embodiment in accordance with the present invention.

In this connection, the arrangement positions of sensors 107 and the number of sensors 107, indicated in the schematic diagram shown in FIG. 2, are illustrative only, and the scope of the present invention is not limited thereto. For instance, a temperature sensor equipped in the fixing unit 156 also constitutes a part of the sensors 107. Referring to the results detected by the sensors 107, the control section 101 can determine such an abnormality that relates an image forming process (hereinafter, referred to as an image abnormality), from a fixing temperature abnormality. Further, in a case where the sensor 107$s$B, disposed at a downstream position from the transferring unit 155, is an image sensor, it is possible for the control section 101 to determine the image abnormality from the result of reading the image.

<Configuration of Image Forming System>

Next, as the second example of the present embodiment, the configuration of the image forming system that implements controlling operations for ejecting retention paper sheets will be detailed in the following, based on the schematic diagrams shown in FIG. 3 and FIG. 4.

Herein, the paper sheet feeding apparatus 50, the image forming apparatus 100 and the paper sheet processing apparatus 200 are arranged in accordance with a conveyance flow of a paper sheet. The paper sheet feeding apparatus 50 has a function for feeding plural kinds of paper sheets, accommodated therein, as needed. The image forming apparatus 100 forms an image based on image data thereof, onto each of the paper sheets. The paper sheet processing apparatus 200 applies various kinds of paper sheet processing to the paper sheet on which an image is formed, and then, ejects the processed paper sheet. In this connection, the various kinds of paper sheet processing include a punch processing, a center fold processing, a staple processing, etc.

In this connection, the image forming apparatus 100 included in the second embodiment is basically the same as that indicated in the schematic diagrams shown in FIG. 1 and FIG. 2. However, since the paper sheet processing apparatus 200 is coupled to the image forming apparatus 100 in order to configure the image forming system, the ejecting section 190 is excluded from the image forming apparatus 100. Since the sections other than the ejecting section 190 are the same as those indicated in the first embodiment, the duplicated explanations for them will be omitted hereinafter.

The paper sheet processing apparatus 200 is constituted by a control section 201, a communication section 202, sensors 207, a conveyance section 210, a paper sheet processing section 250 and an ejecting section 290. The control section 201 controls various kinds of sections included within the paper sheet processing apparatus 200. The communication section 202 has a function for communicating with the other apparatuses coupled thereto.

Each of the sensors 207 serves as a position detecting section and/or an abnormality detecting section for detecting an abnormality in an image formed on the paper sheet and/or another abnormality in the conveyance state of the paper sheet, such as the deviation in the sub-scanning direction at the time of the conveyance operation, the conveyance delay at the time of the conveyance operation, etc. The conveyance section 210 conveys paper sheets within the paper sheet processing apparatus 200. The paper sheet processing section 250 applies various kinds of paper sheet processing to the paper sheet. The ejecting section 290 ejects the paper sheet onto an ejecting sub-tray 290$s$ or an ejecting main-tray 290$m$. In this connection, it is possible for the paper sheet processing section 250 to apply various kinds of paper sheet processing, including a punch processing, a center fold processing, a staple processing, etc., to the paper sheet as needed.

As the sensors 207, sensors 207$s$H, 207$s$I, 207$s$J and 207$s$K, each of which serves as the position detecting section and/or the abnormality detecting section, are arranged in this order towards the ejecting sub-tray 290$s$ and the ejecting main-tray 290$m$ along the conveyance section 210.

Each of the sensors 207 notifies the control section 201 of the detected result of detecting the abnormality in the image formed on the paper sheet and/or the other abnormality in the conveyance state of the paper sheet, such as a position in the sub-scanning direction at the time of the conveying operation (presence or absence of the deviation), a passing timing in the sub-scanning direction at the time of the conveying operation (presence or absence of the conveyance delay), etc. In this connection, the arrangement positions of sensors 207 and the number of sensors 207, indicated in the schematic diagram shown in FIG. 4, are illustrative only, and the scope of the present invention is not limited thereto.

Figure 3:
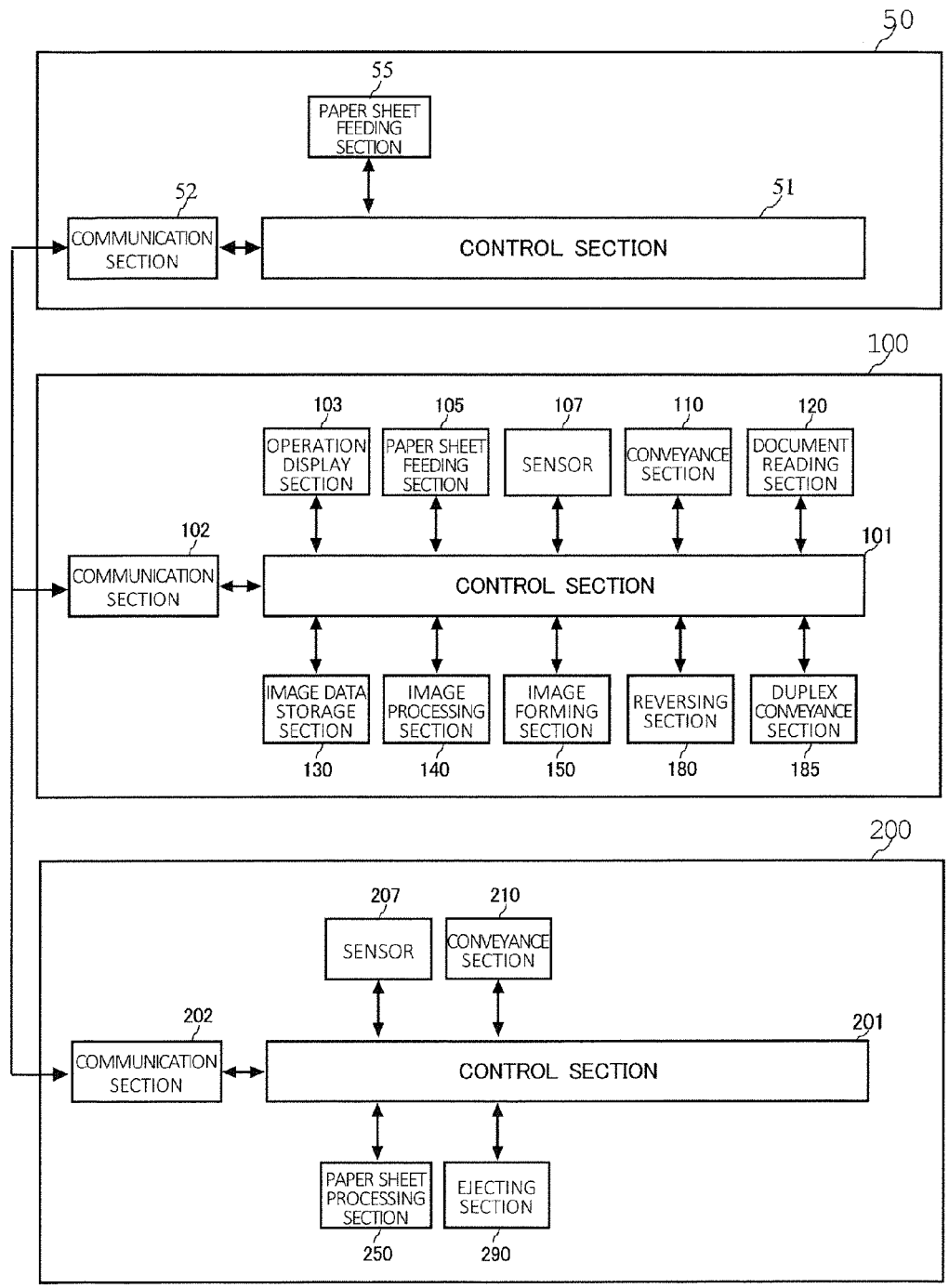
FIG. 3 is a schematic diagram showing a configuration of an embodiment in accordance with the present invention.
Figure 4:
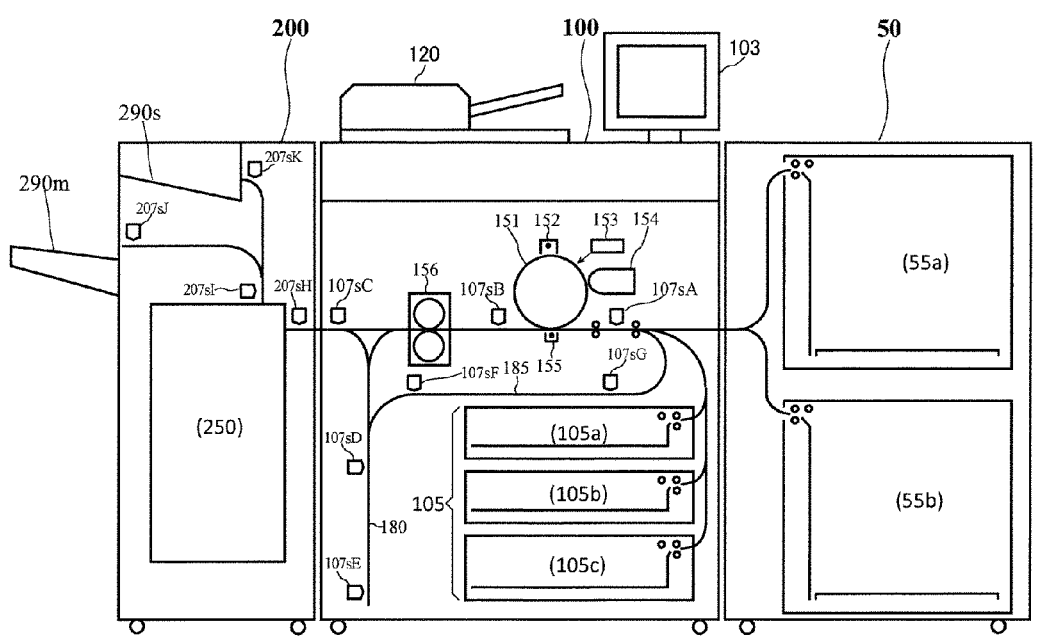
FIG. 4 is a schematic diagram showing a configuration of an embodiment in accordance with the present invention.

Further, the control section 101 indicated in the schematic diagrams shown in FIG. 1 and FIG. 3 controls the image forming operation and the paper sheet conveying operation, based on the results detected by the sensors 107 and the sensors 207, both serving as the position detecting section and/or the abnormality detecting section.

Still further, when an abnormality is detected, corresponding to contents of the abnormality and respective positions of the retention paper sheets remaining within the apparatus concerned, the control section 101 is provided with:

a first determining function for making the first determination in regard to whether or not it is possible to eject each of the paper sheets;

a second determining function for making the second determination in regard to whether or not it is necessary to form the concerned image onto a new paper sheet so as to re-output the new paper sheet, corresponding to contents of the abnormality and respective positions of the retention paper sheets remaining within the apparatus concerned, when an abnormality is detected; and a controlling function for controlling the image forming operation and the conveying operation, based on the results of the first determination and the second determination.

Still further, the control section 101, indicated in the schematic diagrams shown in FIG. 1 and FIG. 3, is provided with:

a function for deactivating the conveyance action of each of the paper sheets remaining within the apparatus, in a case where it is determined in the first determination that any one of the paper sheets cannot be outputted;

another function for controlling the system so as to eject each of the paper sheets, currently remaining within the apparatus, outside through an ejection opening, in a case where it is determined in the first determination that it is possible to eject each of the paper sheets outside and it is determined in the second determination that the re-outputting operation is not necessary; and still another function for controlling the system so as to incompletely eject each of the paper sheets, currently remaining within the image forming system and the image forming apparatus, outside from an ejection opening, in a case where it is determined in the first determination that it is possible to eject each of the paper sheets outside and it is determined in the second determination that the re-outputting operation is necessary.

In this connection, the above-mentioned sentence of "controlling the system so as to incompletely eject each of the paper sheets, currently remaining within the image forming system and the image forming apparatus, outside from an ejection opening" is defined as such a conveyance controlling operation that the ejecting action is deactivated in such a state that a leading portion of the paper sheet is extruded from the ejection opening, serving as an outlet port of the paper sheet ejecting section, while the remaining portion of the concerned paper sheet still stays within the image forming system or the image forming apparatus, in order to make it clear that a paper sheet, which is about to get out from the ejection opening, still exists. Hereinafter in the present specification, the state of "controlling the system so as to incompletely eject each of the paper sheets, currently remaining within the image forming system and the image forming apparatus, outside from an ejection opening" is called a "head extruded stoppage". In addition, hereinafter in the present specification, such the controlling operation as "controlling the system so as to incompletely eject each of the paper sheets, currently remaining within the image forming system and the image forming apparatus, outside from an ejection opening" is called a "head extrusion controlling operation".

Further, the single/plural paper sheet(s), which remain(s) within the paper sheet feeding apparatus 50, the image forming apparatus 100 and/or the paper sheet processing apparatus 200 at the time when an abnormality is detected, is/are called "retention paper sheet(s)". Still further, the "ejection opening" is defined as an outlet from which the paper sheet is ejected from the image forming apparatus 100 onto the ejecting tray 190$m$, or outlet portions from one of which the paper sheet is ejected from the paper sheet processing apparatus 200 onto the ejecting main-tray 290$m$ or the ejecting sub-tray 290$s$.

<Overall Operations>

Referring to the flowchart shown in FIG. 5, the overall operations to be conducted in the image forming apparatus 100, indicated in the schematic diagrams shown in FIG. 1 through FIG. 4, will be detailed in the following.

The control section 101 monitors the results detected by the sensors 107$s$A through 107$s$G, or the sensors 107$s$A through 107$s$G and the sensors 207$s$H through 207$s$K. When a certain abnormality is detected by any one of the sensors 107$s$A through 107$s$G, or the sensors 107$s$A through 107$s$G and the sensors 207$s$H through 207$s$K, the control section 101 discriminates the contents of the abnormality (Step S101, shown in FIG. 5). Concretely speaking, when a certain abnormality is detected, the control section 101 determines whether the detected abnormality is related to the image formed on the paper sheet, or the conveyance state of the paper sheet (such as the position in a sub-scanning direction at the time of the conveying operation (presence or absence of a deviation), the passing timing in the sub-scanning direction at the time of the conveying operation (presence or absence of a conveyance delay), etc.) (Step S101, shown in FIG. 5).

When determining that the detected abnormality is related to the operation for controlling the image forming process, instead of the paper sheet conveyance operation (Step S101; NO, shown in FIG. 5), it would be possible that any one of a mechanical damage caused by the paper sheet, a paper sheet wrapping around a certain mechanical portion, a contact between paper sheets at a high temperature section, etc., has occurred. Accordingly, precedential to the determinations to be made in the following steps, the control section 101 immediately deactivates the operations for forming images onto the retention paper sheets remaining within the image forming apparatus concerned and for conveying the retention paper sheets concerned (Step S102, shown in FIG. 5).

On the other hand, when determining that the detected abnormality is related to the conveyance state of the paper sheet (Step S101; YES, shown in FIG. 5), the control section 101 confirms the position of the retention paper sheet from the results detected by the sensors 107$s$A through 107$s$G, or the sensors 107$s$A through 107$s$G and the sensors 207$s$H through 207$s$K (Step S103, shown in FIG. 5).

Figure 5:
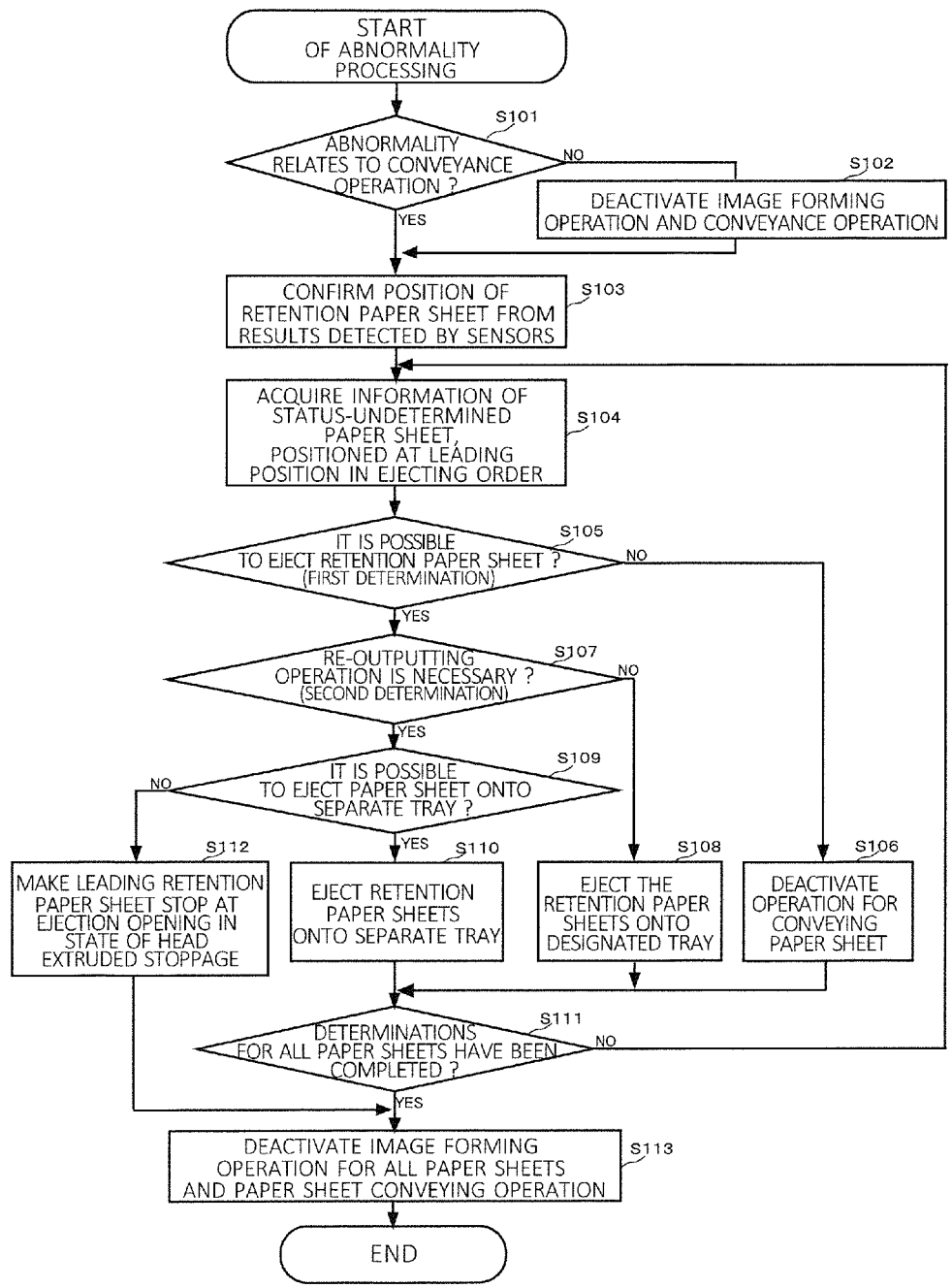
FIG. 5 is a flowchart indicating operations of an embodiment in accordance with the present invention.

Successively, as the first determination, the control section 101 determines whether or not it is possible to eject the retention paper sheets onto the designated ejecting tray of the ejecting section 190 (for instance, the ejecting tray 190$m$ or the ejecting main-tray 290$m$) as the job (Step S105, shown in FIG. 5). Further, as the second determination, the control section 101 determines whether or not it is necessary to for in the concerned image onto a new paper sheet so as to re-output the new paper sheet, corresponding to the contents of the abnormality and the respective positions of the retention paper sheets remaining within the apparatus concerned (Step S107, shown in FIG. 5), and further, determines whether or not it is possible to eject the paper sheet outside through a separate ejection opening that is not designated in advance, in a case where plural ejection openings are provided in a selectable manner as indicated in the schematic diagrams shown in FIG. 3 and FIG. 4 (Step S109, shown in FIG. 5). In this connection, with respect to all of the status-undetermined retention paper sheets, the control section 101 sequentially makes the first determination and the second determination one by one in order of the ejecting sequence from a leading paper sheet to a trailing paper sheet (Steps S104 through S111, shown in FIG. 5).

Still successively, with respect to all of the retention paper sheets, the control section 101 completes the sequential determining operations above-mentioned (Step S111; YES, shown in FIG. 5), and when determining that it is impossible to eject the retention paper sheets onto the designated ejecting section, the control section 101 controls the system (Step S113, shown in FIG. 5) so as to deactivate the conveying operation (Step S105; NO, Step S106, shown in FIG. 5).

Still successively, with respect to all of the retention paper sheets, the control section 101 completes the sequential determining operations above-mentioned (Step S111; YES, shown in FIG. 5), and when determining in the first determination that it is possible to eject, and determining in the second determination that the re-outputting operation is not necessary, the control section 101 controls the system (Step S113, shown in FIG. 5) so as to eject the retention paper sheets onto the designated tray (Step S105; YES, Step S107; NO, Step S108, shown in FIG. 5).

Yet successively, with respect to all of the retention paper sheets, the control section 101 completes the sequential determining operations above-mentioned (Step S111; YES, shown in FIG. 5), and when determining in the first determination that it is possible to eject, and determining in the second determination that the re-outputting operation is necessary and it is possible to ejects the retention paper sheets onto the separate tray, the control section 101 controls the system (Step S113, shown in FIG. 5) so as to eject the retention paper sheets onto the separate tray (Step S105; YES, Step S107; YES, Step S109; YES, Step S110, shown in FIG. 5).

Further, with respect to the leading retention paper sheet, the control section 101 sequentially makes the determinations as above-mentioned (Step S105, Step S107, Step S109, shown in FIG. 5), and then, when determining in the first determination that it is possible to eject, and determining in the second determination that the re-outputting operation is not necessary and it is impossible to ejects the retention paper sheets onto the separate tray, the control section 101 controls the system so as to make the leading retention paper sheet stop in a state of the head extruded stoppage (Step S105; YES, Step S107; YES, Step S109; NO, Step S112, shown in FIG. 5).

In this connection, the flowchart shown in FIG. 5 represents the abnormality processing in regard to the retention paper sheets. Accordingly, after all of the retention paper sheets have been removed, the control section 101 conducts the controlling operations for implementing the normal recovery processing so as to commence the image forming operation and the conveying operation from the image of the necessary page.

<First Operating Mode>

Figure 6:
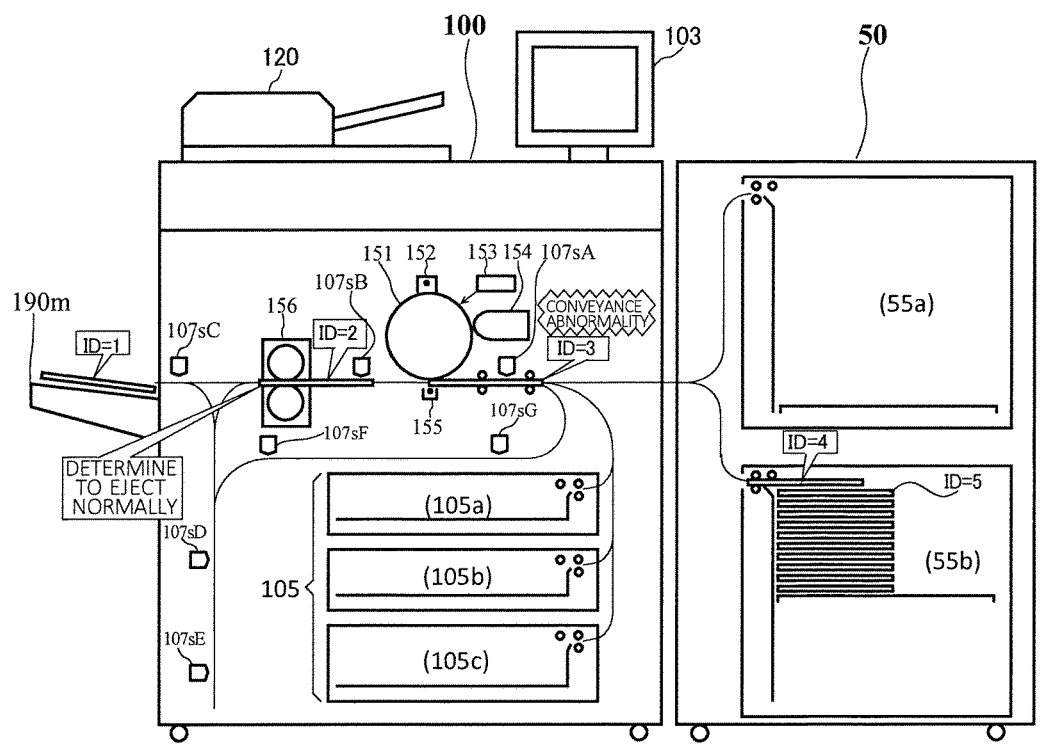
FIG. 6 is an explanatory schematic diagram showing an operation status of an embodiment in accordance with the present invention.

Next, referring to the flowchart shown in FIG. 5 and the operation-status explanatory schematic diagram shown in FIG. 6, the first operating mode in accordance with the embodiment of the present invention will be detailed in the following.

Incidentally, a paper sheet number (hereinafter, referred to as an ID), serving as paper sheet information, is attached to each of the paper sheets. Based on the paper sheet number, the control section 101 conducts controlling operations for implementing the abnormality detecting operation, the image forming operation and the conveying operation. Herein, as indicated in the schematic diagram shown in FIG. 6, the single-sided image forming operation for four paper sheets respectively having IDs=1 through 4, which are respectively at the timings of the statuses indicated as follows, will be detailed in the following.

(1a) The paper sheet having IT)=1 has been already ejected onto the ejecting main-tray 190m.

(1b) The paper sheet having ID=2 is in midcourse of the fixing operation at the fixing unit 156 after the image forming operation has been completed by the image forming section 150.

(1c) With respect to the paper sheet having ID=3, an occurrence of the conveyance abnormality (for instance, a one-side deviating abnormality during the conveyance operation) is detected by the sensor 107sA, just before the image forming section 150 applies the image forming operation to the paper sheet concerned.

(1d) The paper sheet having ID=4 is about to be fed from the paper sheet feeding section 55b.

In this connection, since the paper sheet having ID=1 is already ejected outside, the concerned paper sheet is not at all the retention paper sheet. Accordingly, the control section 101 makes no determination with respect to the paper sheet having ID=1. The paper sheet having ID=2 has no abnormality in regard to both the image forming operation and the conveying operation. Accordingly, the control section 101 determines as the first determination that it is possible to eject the paper sheet having ID=2 outside, and determines as the second determination that the re-outputting operation is not necessary. Then, the control section 101 controls the apparatus so as to eject the paper sheet having ID=2 onto the ejecting tray 190m, serving as the designated ejecting tray (Step S105; YES, Step S107; NO, Step S108, shown in FIG. 5).

With respect to the paper sheet having ID=3, the conveyance abnormality has occurred. Owing to this abnormality, the operation for forming an image onto the predetermined position on the paper sheet having ID=3 is not guaranteed. Accordingly, the control section 101 determines that the re-outputting operation is necessary and it is impossible to eject the paper sheet (Step S105; NO, shown in FIG. 5). Based on this determination, the control section 101 controls the conveyance section 110 to deactivate the operation for conveying the paper sheet having ID=3 (Step S106, shown in FIG. 6).

As described in the foregoing, in a case where a certain abnormality is detected at the time when an image is to be formed onto the paper sheet, and it is possible to eject the concerned paper sheet outside and the re-outputting operation is not necessary, the paper sheet is ejected outside through the ejection opening. According to this operation, it becomes possible to prevent the necessary page from dropping out. Further, in a case where it is impossible to eject the paper sheet, by deactivating the operation for conveying the paper sheet, the damage of each of the concerned sections may not be increased.

In this connection, the control section 101 displays a message that urges the user to manually remove the retention paper sheets, having ID=3 and ID=4 respectively, on the operation display section 103. Then, if the control section 101 has confirmed with the sensors 107 that the retention paper sheets, having ID=3 and ID=4 respectively, were removed, the control section 101 controls the system so as to resume the processing for forming the images, which were to be formed onto the paper sheets having IDs equal to or greater than 3, onto the other paper sheets having IDs equal to or greater than 5. According to the above-mentioned operation, the paper sheets, on which the images are respectively formed in order of ID=1, ID=2, ID=5, . . . , are sequentially stacked onto the ejecting tray 190m.

<Second Operating Mode>

Figure 7:
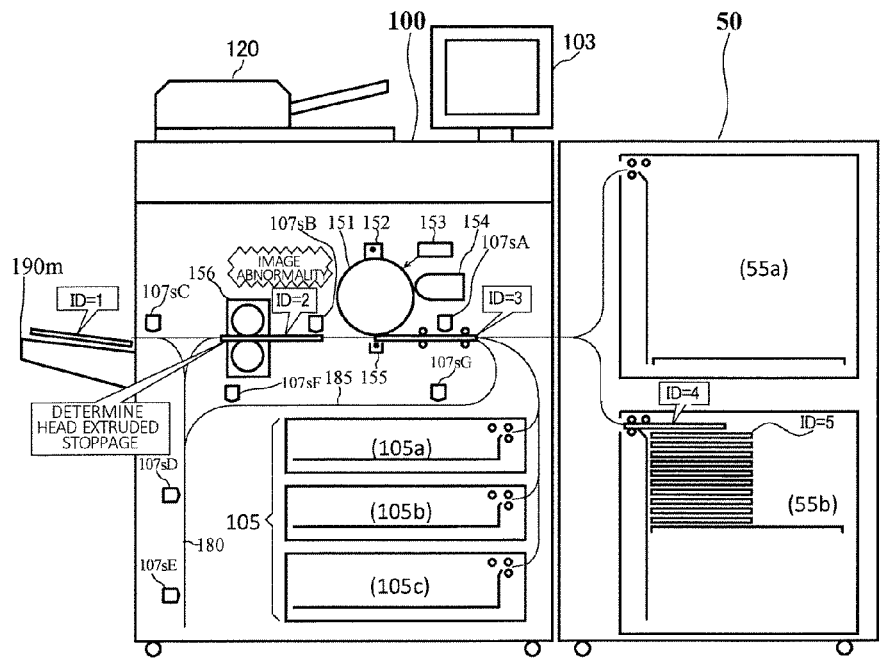
FIG. 7 is an explanatory schematic diagram showing an operation status of an embodiment in accordance with the present invention.
Figure 8:
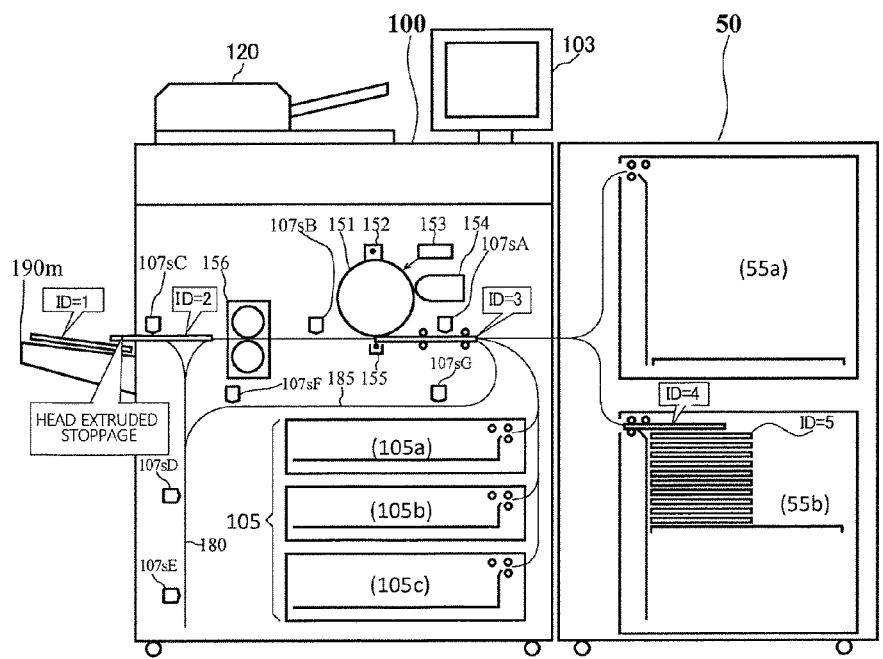
FIG. 8 is an explanatory schematic diagram showing an operation status of an embodiment in accordance with the present invention.

Next, referring to the flowchart shown in FIG. 5 and the operation-status explanatory schematic diagrams shown in FIG. 7 and FIG. 8, the second operating mode in accordance with the embodiment of the present invention will be detailed in the following.

Herein, as indicated in the schematic diagram shown in FIG. 7, the single-sided image forming operation for four paper sheets respectively having IDs=1 through 4, which are respectively at the timings of the statuses indicated as follows, will be detailed in the following.

(2a) The paper sheet having ID=1 has been already ejected onto the ejecting main-tray 190m.

(2b) With respect to the paper sheet having ID=2, an image abnormality (for instance, a fixing temperature abnormality, etc.) is detected in midcourse of the fixing operation at the fixing unit 156 after the image forming operation has been completed by the image forming section 150.

(2c) The paper sheet having ID=3 arrives at a position, just before the image forming section 150 applies the image forming operation thereto.

(2d) The paper sheet having ID=4 is about to be fed from the paper sheet feeding section 55b.

In this connection, since the paper sheet having ID=1 is already ejected outside, the concerned paper sheet is not at all the retention paper sheet. Accordingly, the control section 101 makes no determination with respect to the paper sheet having ID=1. With respect to the paper sheet having ID=2, the image abnormality has occurred. Accordingly, the control section 101 controls the apparatus so as to immediately deactivate the image forming operation and the paper sheet conveying operation (Step S101; NO, Step S102, shown in FIG. 5).

Further, since the image abnormality has been generated on the paper sheet having ID=2, the control section 101 determines as the first determination that it is possible to eject the paper sheet having ID=2 outside, and determines as the second determination that the re-outputting operation is necessary (Step S105; YES, Step S107; YES, shown in FIG. 5). In this connection, since the image forming apparatus 100 is provided with only a single ejecting section, it is impossible to eject the paper sheet having ID=2 onto a separate tray (Step S109; NO, shown in FIG. 5). Accordingly, the control section 101 controls the apparatus so as to make the paper sheet having ID=2 stop at the ejecting section 190 in the state of the head extruded stoppage (Step S112 shown in FIG. 5). In this case, the control section 101 controls the conveyance section 110 so as to convey the paper sheet having ID=2, and then, deactivates the conveying operation at the time point when the conveyance time, being equivalent to the time for conveying, for instance, the half of paper-sheet length, has elapsed, after the concerned paper sheet has passed through the sensor 107sC disposed in the vicinity of the ejection opening (refer to "HEAD EXTRUDED STOPPAGE" shown in FIG. 8).

Still further, since the paper sheet having ID=2 is ejected in the mode of the head extruded stoppage, the control section 101 determines that it is impossible to eject the paper sheets having ID=3 and ID=4. In other words, the paper sheets having ID=3 and ID=4 are handled as the retention paper sheets. In this connection, the control section 101 displays a message that urges the user to manually remove the retention paper sheets, having ID=3 and ID=4 respectively, on the operation display section 103.

Then, if the control section 101 has confirmed with the sensors 107 that the paper sheet, having ID=2 and currently stopping in the mode of the head extruded stoppage, and the retention paper sheets, having ID=3 and ID=4 respectively, were removed, the control section 101 controls the apparatus so as to resume the processing for forming the images, which were to be formed onto the paper sheets having IDs equal to or greater than 2, onto the other paper sheets having IDs equal to or greater than 5.

Thanks to the head extruded stoppage of the paper sheet having ID=2 as described in the above, it becomes easy for the user to remove the paper sheet having ID=2 that was tightly clipped by the pair of fixing rollers provided in the fixing unit 156 at the time of the paper jam occurrence. Further, according to the head extruded stoppage of the paper sheet having ID=2 as described in the above, the paper sheet having ID=2 and the other normal paper sheets currently ejected onto the ejecting section 190 never be mingled together.

In this connection, if the head extruded stoppage, described as the second operating mode, is not applied, the paper sheet having ID=2 remains in a state that the concerned paper sheet is still tightly clipped by the pair of fixing rollers provided in the fixing unit 156, and accordingly, it is difficult to remove the paper sheet having ID=2. On the other hand, if the paper sheet having ID=2 is completely ejected onto the ejecting section 190 without employing the head extruded stoppage mode, it may appear such a state that the paper sheet, having ID=2, and the other normal paper sheets, currently ejected onto the ejecting section 190, are mingled together.

In other words, according to the second operating mode described in the above, on an occasion of forming an image onto a paper sheet, in a case where a certain abnormality is detected in the image to be formed or in the operation for conveying the paper sheet, and it is possible to eject the paper sheet and the re-outputting operation is necessary, the control section controls the system so as to incompletely eject the paper sheet in such a manner that only a leading part of the paper sheet is extruded from the ejection opening. By controlling the apparatus as above-mentioned, even in a case where it is impossible to eject the concerned paper sheet onto a separate tray, it becomes possible to prevent the retention paper sheet from remaining at an apparatus-inner position, from which it is difficult for the user to remove the retention paper sheet concerned. In addition, by controlling the apparatus as above-mentioned, even in a case where it is impossible to eject the concerned paper sheet onto a separate tray, it becomes possible to prevent a page duplication caused by the mixture of the retention paper sheet and the successive paper sheets.

<Third Operating Mode>

Figure 9:
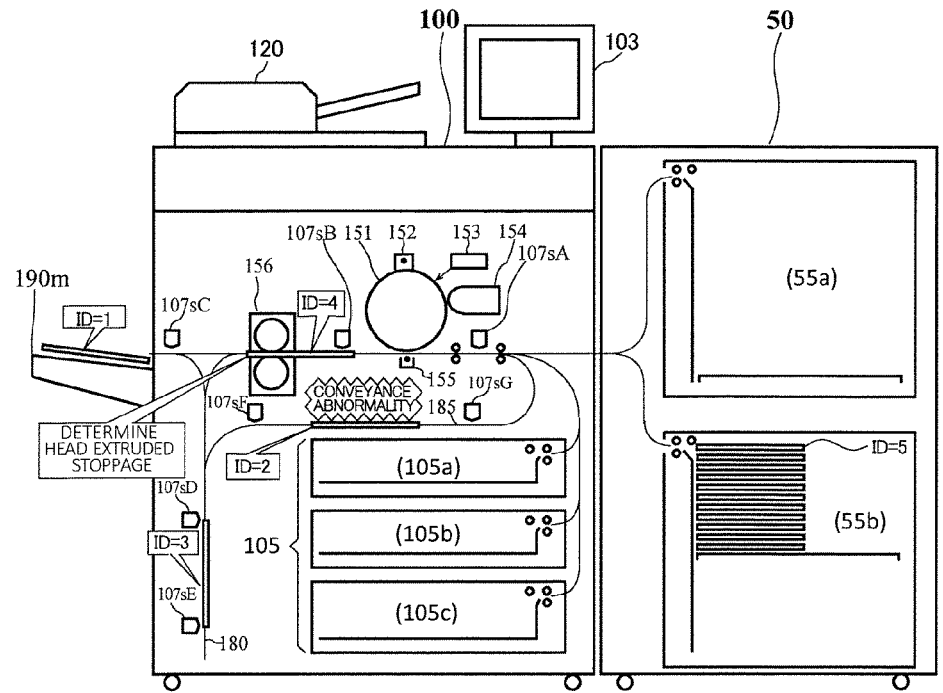
FIG. 9 is an explanatory schematic diagram showing an operation status of an embodiment in accordance with the present invention.
Figure 10:
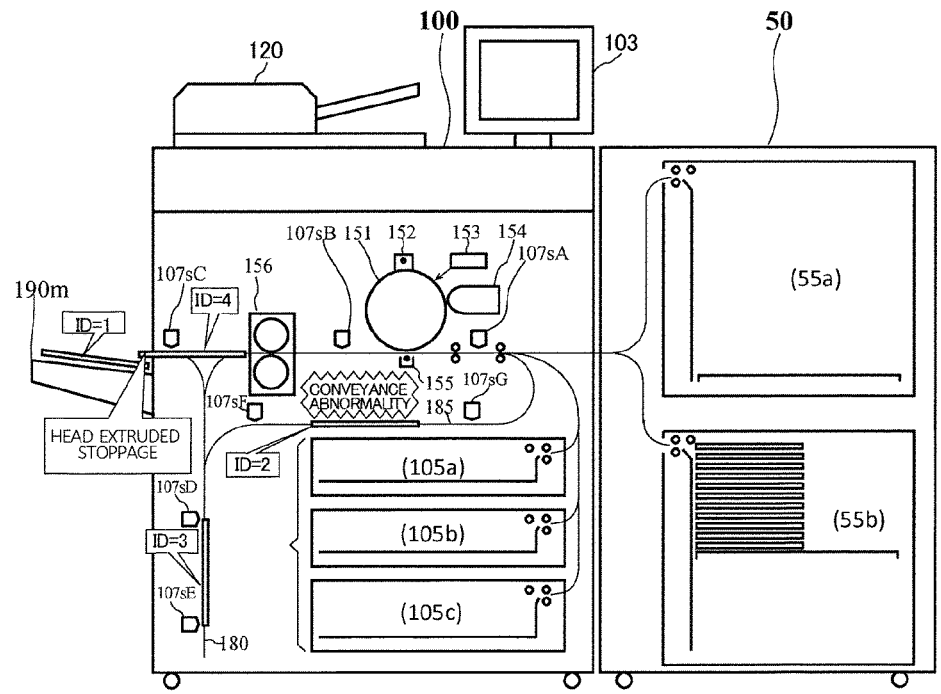
FIG. 10 is an explanatory schematic diagram showing an operation status of an embodiment in accordance with the present invention.

Next, referring to the flowchart shown in FIG. 5 and the operation-status explanatory schematic diagrams shown in FIG. 9 and FIG. 10, the third operating mode in accordance with the embodiment of the present invention will be detailed in the following.

Herein, as indicated in the schematic diagram shown in FIG. 9, the duplex image forming operation for four paper sheets respectively having IDs=1 through 4, which are respectively at the timings of the statuses indicated as follows, will be detailed in the following.

(3a) The paper sheet having ID=1 has been already ejected onto the ejecting main-tray 190m.

(3b) With respect to the paper sheet having ID=2, an occurrence of a conveyance abnormality (for instance, a conveyance delay in which the paper sheet does not arrive the sensor 107sG at the predetermined timing) is detected in midcourse of the conveying operation at the duplex conveyance section 185 after the image forming operation for the first surface of the concerned paper sheet has been completed by the image forming section 150.

(3c) The paper sheet having ID=3 arrives at a position, just before the image forming section 150 applies the image forming operation thereto.

(3d) The paper sheet having ID=4 is about to be fed from the paper sheet feeding section 55b.

In this connection, since the paper sheet having ID=1 is already ejected outside, the concerned paper sheet is not at all the retention paper sheet. Accordingly, the control section 101 makes no determination with respect to the paper sheet having ID=1. With respect to the paper sheet having ID=2, the conveyance abnormality in which the paper sheet does not arrive the predetermined position at the predetermined timing, or the like, has occurred. Accordingly, the control section 101 determines that it is impossible to eject the concerned paper sheet outside (Step S105; NO, shown in FIG. 5), and controls the apparatus so as to deactivate the operation for conveying the paper sheet (Step S106, shown in FIG. 5).

The paper sheet having ID=3 is influenced by the fact that the paper sheet having ID=2, currently residing at a preceding position on the conveyance path, is not conveyable. Accordingly, the control section 101 determines that it is impossible to eject the paper sheet having ID=3 outside (Step S105; NO, shown in FIG. 5), and controls the apparatus so as to deactivate the operation for conveying the paper sheet (Step S106, shown in FIG. 5).

The paper sheet having ID=4 is tightly clipped by the pair of fixing rollers provided in the fixing unit 156. Accordingly, with respect to the paper sheet having ID=3, since no retention paper sheet, currently residing at a preceding position, remains on the conveyance path, the control section 101 determines as the first determination that it is possible to eject the paper sheet having ID=3 outside (Step S105; YES, shown in FIG. 5). However, with respect to the paper sheet having ID=4, since the operation for forming an image onto the second surface thereof has not yet finished, the control section 101 determines as the second determination that the re-outputting operation is necessary (Step S107; YES, shown in FIG. 5).

In this connection, since the image forming apparatus 100 is provided with only a single ejecting section, it is impossible to eject the paper sheet onto a separate tray (Step S109; NO, shown in FIG. 5). Accordingly, the control section 101 controls the apparatus so as to make the concerned paper sheet stop at the ejecting section 190 in the state of the head extruded stoppage (Step S112 shown in FIG. 5). In this case, the control section 101 controls the conveyance section 110 so as to convey the paper sheet having ID=4, and then, deactivates the conveying operation at the time point when the conveyance time, being equivalent to the time for conveying, for instance, the half of paper-sheet length, has elapsed, after the concerned paper sheet has passed through the sensor 107sC disposed in the vicinity of the ejection opening (refer to "HEAD EXTRUDED STOPPAGE" shown in FIG. 10).

In this connection, the control section 101 displays a message that urges the user to manually remove the paper sheet, having ID=4 and currently stopping in the state of the head extruded stoppage, and the retention paper sheets, having ID=2 and ID=3 respectively, on the operation display section 103. Then, if the control section 101 has confirmed with the sensors 107 that the paper sheet, having ID=4 and currently stopping in the state of the head extruded stoppage, and the retention paper sheets, having ID=2 and ID=3 respectively, were removed, the control section 101 controls the apparatus so as to resume the processing for forming the images, which were to be formed onto the paper sheets having IDs equal to or greater than 2, onto the other paper sheets having IDs equal to or greater than 5.

Thanks to the head extruded stoppage of the paper sheet having ID=4 as described in the above, it becomes easy for the user to remove the paper sheet having ID=4 that was tightly clipped by the pair of fixing rollers provided in the fixing unit 156. Further, according to the head extruded stoppage of the paper sheet having ID=4 as described in the above, the paper sheet having ID=4 and the other normal paper sheets currently ejected onto the ejecting section 190 never be mingled together.

In this connection, if the head extruded stoppage, described as the third operating mode, is not applied, the paper sheet having ID=4 remains in a state that the concerned paper sheet is still tightly clipped by the pair of fixing rollers provided in the fixing unit 156, and accordingly, it is difficult to remove the paper sheet having ID=4. On the other hand, if the paper sheet having ID=4 is completely ejected onto the ejecting section 190 without employing the head extruded stoppage mode, the ejected paper sheets are stacked onto the tray in order of the paper sheet having ID=1 (images are formed on the both sides thereof), the paper sheet having ID=4 (an image is formed on only the single side thereof), the paper sheet having ID=5 (images are formed on the both sides thereof), . . . . Namely, normal paper sheets and an abnormal paper sheet are mingled together, resulting in a difficulty of discriminating them from each other.

As described in the above, on an occasion of forming an image onto a paper sheet, in a case where a certain abnormality is detected in the image to be formed or in the operation for conveying the paper sheet, and it is possible to eject the paper sheet and the re-outputting operation is necessary, the control section controls the system so as to incompletely eject the paper sheet in such a manner that only a leading part of the paper sheet is extruded from the ejection opening. By controlling the apparatus as above-mentioned, even in a case where it is impossible to eject the concerned paper sheet onto a separate tray, it becomes possible to prevent the retention paper sheet from remaining at an apparatus-inner position, from which it is difficult for the user to remove the retention paper sheet concerned. In addition, by controlling the apparatus as above-mentioned, even in a case where it is impossible to eject the concerned paper sheet onto a separate tray, it becomes possible to prevent a page duplication caused by the mixture of the retention paper sheet and the successive paper sheets.

<Fourth Operating Mode>

Figure 11:
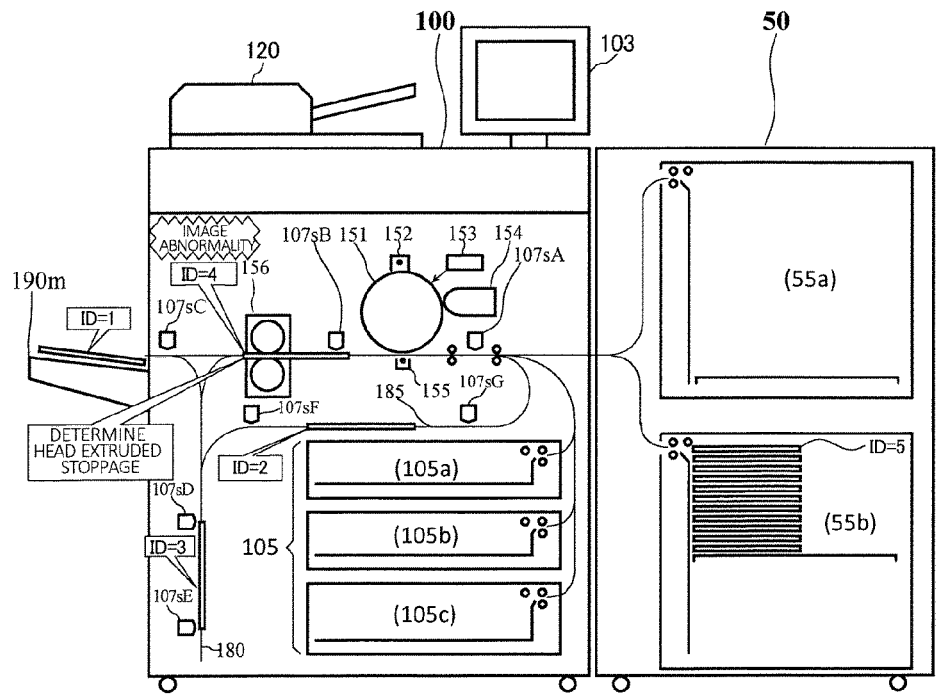
FIG. 11 is an explanatory schematic diagram showing an operation status of an embodiment in accordance with the present invention.

Next, referring to the flowchart shown in FIG. 5 and the operation-status explanatory schematic diagrams shown in FIG. 11 and FIG. 12, the fourth operating mode in accordance with the embodiment of the present invention will be detailed in the following.

Herein, as indicated in the schematic diagram shown in FIG. 11, the duplex image forming operation for four paper sheets respectively having IDs=1 through 4, which are respectively at the timings of the statuses indicated as follows, will be detailed in the following.

(4a) The paper sheet having ID=1 has been already ejected onto the ejecting main-tray 190m.

(4b) The paper sheet having ID=2 is in midcourse of being conveyed by the duplex conveyance section 185 after an image has been formed on the first surface thereof in the image forming section 150.

(4c) The paper sheet having ID=3 is in midcourse of being conveyed by the duplex conveyance section 185 after an image has been formed on the first surface thereof in the image forming section 150.

(4d) With respect to the paper sheet having ID=4, an image abnormality (for instance, a fixing temperature abnormality, etc.) is detected in midcourse of the fixing operation at the fixing unit 156 after the operation for forming an image onto the first surface thereof has been completed.

In this connection, since the paper sheet having ID=1 is already ejected outside, the concerned paper sheet is not at all the retention paper sheet. Accordingly, the control section 101 makes no determination with respect to the paper sheet having ID=1. The paper sheet having ID=2 is influenced by the fact that the paper sheet having ID=4, currently residing at a preceding position on the conveyance path, is not conveyable. Accordingly, the control section 101 determines that it is impossible to eject the paper sheet having ID=2 outside (Step S105; NO, shown in FIG. 5), and controls the apparatus so as to deactivate the operation for conveying the paper sheet (Step S106, shown in FIG. 5).

The paper sheet having ID=3 is influenced by the fact that the paper sheet having ID=2, currently residing at a preceding position on the conveyance path, is not conveyable. Accordingly, the control section 101 determines that it is impossible to eject the paper sheet having ID=3 outside (Step S105; NO, shown in FIG. 5), and controls the apparatus so as to deactivate the operation for conveying the paper sheet (Step S106, shown in FIG. 5).

With respect to the paper sheet having ID=4, the image abnormality has occurred. Accordingly, the control section 101 controls the apparatus so as to immediately deactivate the operation for forming an image and the operation for conveying the paper sheet (Step S101; NO, Step S102, shown in FIG. 5). Further, The paper sheet having ID=4 is tightly clipped by the pair of fixing rollers provided in the fixing unit 156. Accordingly, with respect to the paper sheet having ID=4, since no retention paper sheet, currently residing at a preceding position, remains on the conveyance path. On this reason, since the image abnormality, instead of the conveyance abnormality, occurs in the paper sheet having ID=4, the control section 101 determines as the first determination that it is possible to eject the paper sheet having ID=4 outside (Step S105; YES, shown in FIG. 5). In addition, since the operation for forming an image onto the second surface of the paper sheet having ID=4 has not yet finished, the control section 101 determines as the second determination that the re-outputting operation is necessary (Step S107; YES, shown in FIG. 5). In this connection, since the image forming apparatus 100 is provided with only a single ejecting section, it is impossible to eject the paper sheet having ID=4 onto a separate tray (Step S109; NO, shown in FIG. 5). Accordingly, the control section 101 controls the apparatus so as to make the paper sheet having ID=4 stop at the ejecting section 190 in the state of the head extruded stoppage (Step S112 shown in FIG. 5).

Figure 12:
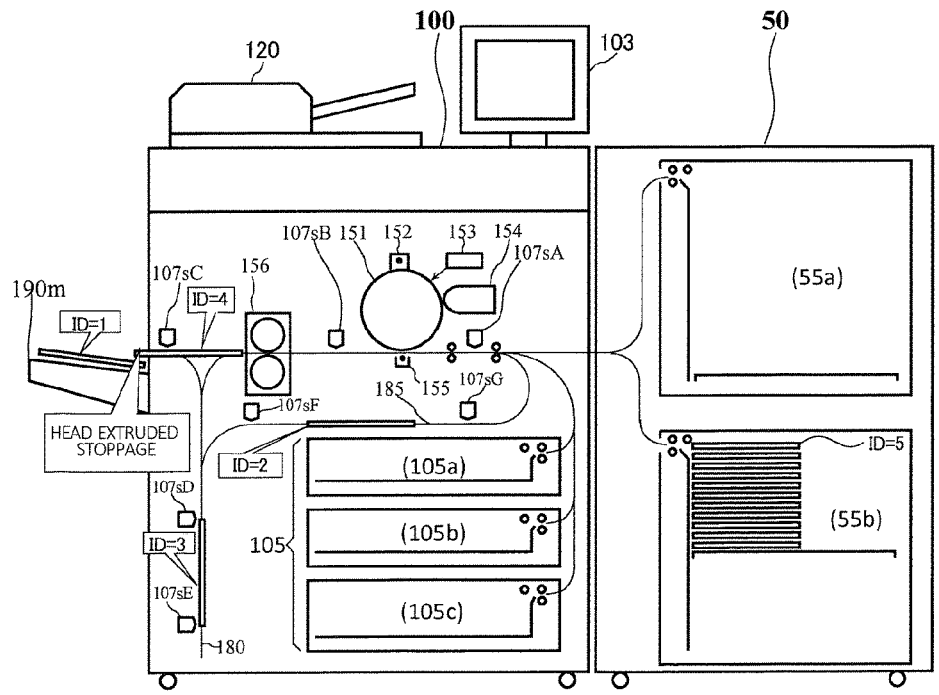
FIG. 12 is an explanatory schematic diagram showing an operation status of an embodiment in accordance with the present invention.

In this case, the control section 101 controls the conveyance section 110 so as to convey the paper sheet having ID=4, and then, deactivates the conveying operation at the time point when the conveyance time, being equivalent to the time for conveying, for instance, the half of the paper-sheet length, has elapsed, after the concerned paper sheet has passed through the sensor 107sC disposed in the vicinity of the ejection opening (refer to "HEAD EXTRUDED STOPPAGE" shown in FIG. 12).

In this connection, the control section 101 displays a message that urges the user to manually remove the paper sheet, having ID=4 and currently stopping in the state of the head extruded stoppage, and the retention paper sheets, having ID=2 and ID=3 respectively, on the operation display section 103. Then, if the control section 101 has confirmed with the sensors 107 that the paper sheet, having ID=4 and currently stopping in the state of the head extruded stoppage, and the retention paper sheets, having ID=2 and ID=3 respectively, were removed, the control section 101 controls the system so as to resume the processing for forming the images, which were to be formed onto the paper sheets having IDs equal to or greater than 2, onto the other paper sheets having IDs equal to or greater than 5.

Thanks to the head extruded stoppage of the paper sheet having ID=4 as described in the above, it becomes easy for the user to remove the paper sheet having ID=4 that was tightly clipped by the pair of fixing rollers provided in the fixing unit 156. Further, according to the head extruded stoppage of the paper sheet having ID=4 as described in the above, the paper sheet having ID=4 and the other normal paper sheets currently ejected onto the ejecting section 190 never be mingled together.

In this connection, if the head extruded stoppage, described as the fourth operating mode, is not applied, the paper sheet having ID=4 remains in a state that the concerned paper sheet is still tightly clipped by the pair of fixing rollers provided in the fixing unit 156, and accordingly, it is difficult to remove the paper sheet having ID=4. On the other hand, if the paper sheet having ID=4 is completely ejected onto the ejecting section 190 without employing the head extruded stoppage mode, the ejected paper sheets are stacked onto the tray in order of the paper sheet having ID=1 (images are formed on the both sides thereof), the paper sheet having ID=4 (an image is formed on only the single side thereof), the paper sheet having ID=5 (images are formed on the both sides thereof), . . . . Namely, normal paper sheets and an abnormal paper sheet are mingled together, resulting in a difficulty of discriminating them from each other.

As described in the above, on an occasion of forming an image onto a paper sheet, in a case where a certain abnormality is detected in the image to be formed or in the operation for conveying the paper sheet, and it is possible to eject the paper sheet and the re-outputting operation is necessary, the control section controls the system so as to incompletely eject the paper sheet in such a manner that only a leading part of the paper sheet is extruded from the ejection opening. By controlling the apparatus as above-mentioned, even in a case where it is impossible to eject the concerned paper sheet onto a separate tray, it becomes possible to prevent the retention paper sheet from remaining at an apparatus-inner position, from which it is difficult for the user to remove the retention paper sheet concerned. In addition, by controlling the apparatus as above-mentioned, even in a case where it is impossible to eject the concerned paper sheet onto a separate tray, it becomes possible to prevent a page duplication caused by the mixture of the retention paper sheet and the successive paper sheets.

In this connection, as the modified example of the fourth operating mode, considered is such a case that a certain abnormality occurs at a portion other than the paper sheet having ID=4 in a state that no image abnormality is generated on the first surface of the paper sheet having ID=4 and an image is formed on the second surface of the paper sheet having ID=4, and then, the paper sheet having ID=4 is tightly clipped by the fixing rollers provided in the fixing unit 156. In this connection, according to the above-mentioned assumption, the paper sheets, respectively having ID=1 and ID=2, has been already ejected outside.

In the above-mentioned case, the control section 101 controls the system so as to deactivate the image forming operation once. For this reason, even if the images are formed on both sides of the paper sheet having ID=4, due to the abrupt stoppage of the fixing operation currently performed in the fixing unit 156, the fixing operation for the concerned paper sheet could not be completed appropriately.

In this connection, with respect to the paper sheet having ID=4, since no preceding paper sheet remains on the conveyance path, and the image abnormality, instead of the conveyance abnormality, is generated, the control section 101 determines as the first determination that it is possible to eject the paper sheet having ID=3 outside (Step S105; YES, shown in FIG. 5). In addition, since the fixing operation for the concerned paper sheet has not been completed appropriately, the control section 101 determines as the second determination that the re-outputting operation is necessary (Step S107; YES, shown in FIG. 5). Further, since the image forming apparatus 100 is provided with only a single ejecting section, it is impossible to eject the paper sheet onto a separate tray (Step S109; NO, shown in FIG. 5). Accordingly, the control section 101 controls the system so as to make the paper sheet having ID=4 stop at the ejecting section 190 in the state of the head extruded stoppage (Step S112 shown in FIG. 5).

In this case, on an occasion of forming an image onto a paper sheet, in a case where a certain abnormality is detected in the image to be formed or in the operation for conveying the paper sheet, and it is possible to eject the paper sheet and the re-outputting operation is necessary, the control section controls the system so as to incompletely eject the paper sheet in such a manner that only a leading part of the paper sheet is extruded from the ejection opening, as well. By controlling the apparatus as above-mentioned, even in a case where it is impossible to eject the concerned paper sheet onto a separate tray, it becomes possible to prevent the retention paper sheet from remaining at an apparatus-inner position, from which it is difficult for the user to remove the retention paper sheet concerned. In addition, by controlling the apparatus as above-mentioned, even in a case where it is impossible to eject the concerned paper sheet onto a separate tray, it becomes possible to prevent a page duplication caused by the mixture of the retention paper sheet and the successive paper sheets.

<Fifth Operating Mode>

Next, referring to the flowchart shown in FIG. 5 and the operation-status explanatory schematic diagrams shown in FIG. 13 and FIG. 14, the fifth operating mode in accordance with the embodiment of the present invention will be detailed in the following.

Figure 13:
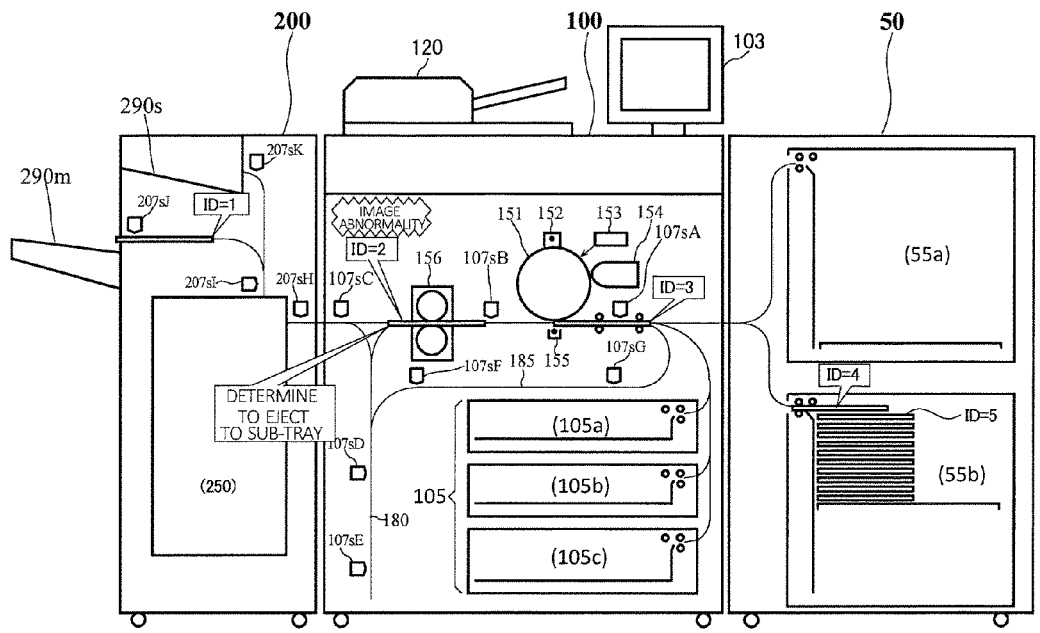
FIG. 13 is an explanatory schematic diagram showing an operation status of an embodiment in accordance with the present invention.
Figure 14:
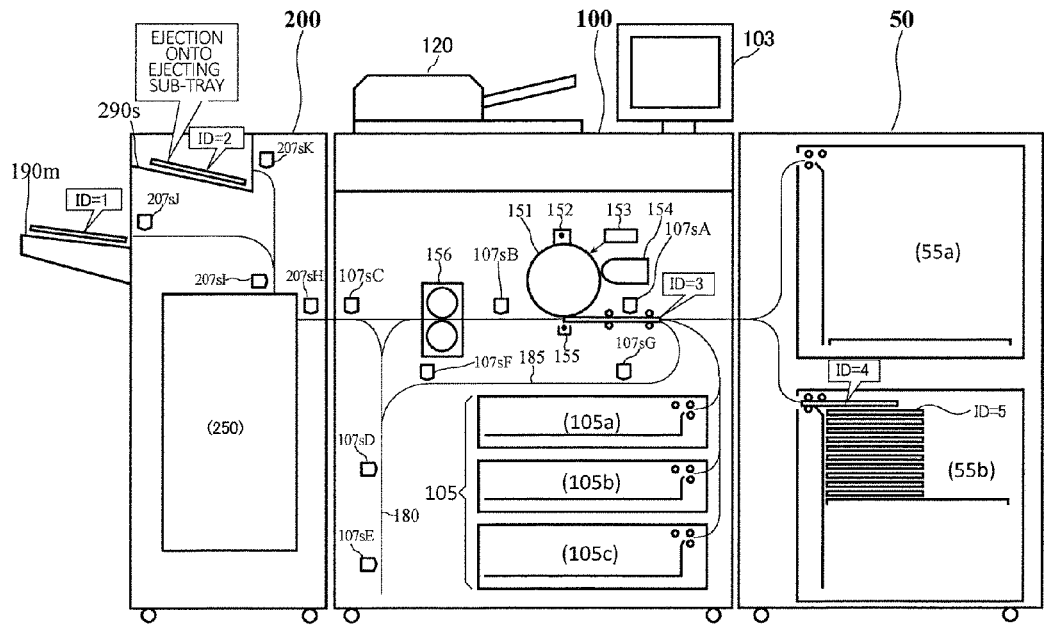
FIG. 14 is an explanatory schematic diagram showing an operation status of an embodiment in accordance with the present invention.

Herein, as indicated in the schematic diagram shown in FIG. 13, the image forming system, in which the paper sheet processing apparatus 200 is coupled to the image forming apparatus 100, is employed. In this image forming system, it is possible to eject the paper sheets onto the ejecting main-tray 290m and/or the ejecting sub-tray 290s. As indicated in the schematic diagram shown in FIG. 13, the single-sided image forming operation for four paper sheets respectively having IDs=1 through 4, which are respectively at the timings of the statuses indicated as follows, will be detailed in the following.

(5a) The paper sheet having ID=1 is in midcourse of being conveyed within the paper sheet processing apparatus 200 after the image has been formed thereon by the image forming section 150.

(5b) With respect to the paper sheet having ID=2, an image abnormality (for instance, a fixing temperature abnormality, etc.) is detected in midcourse of the fixing operation at the fixing unit 156 after the image has been formed thereon by the image forming section 150.

(5c) The paper sheet having ID=3 arrives at a position, just before the image forming section 150 applies the image forming operation thereto.

(5d) The paper sheet having ID=4 is about to be fed from the paper sheet feeding section 55b.

In this connection, the image forming operation for the paper sheet having ID=1 is already finished. In addition, with respect to the paper sheet having ID=1, neither image forming operation nor the conveying operation generates an abnormality. Accordingly, the control section 101 determines as the first determination that it is possible to eject the paper sheet having ID=1 outside, and determines as the second determination that the re-outputting operation is not necessary (Step S105; YES, Step S107; NO, Step S108, shown in FIG. 5).

With respect to the paper sheet having ID=2, the image abnormality has occurred. Accordingly, the control section 101 controls the system so as to immediately deactivate the operation for forming an image and the operation for conveying the paper sheet (Step S101; NO, Step S102, shown in FIG. 5). Further, since the image abnormality is generated on the paper sheet having ID=2, the control section 101 determines as the first determination that it is possible to eject the paper sheet having ID=2 outside, and determines as the second determination that the re-outputting operation is necessary (Step S105; YES, Step S107; YES, shown in FIG. 5). Still further, it is possible to eject the paper sheet having ID=2 onto a separate tray (Step S109; YES, shown in FIG. 5). Accordingly, the control section 101 controls the system so as to eject the paper sheet having ID=2 onto the ejecting sub-tray 290s serving as a separate tray (Step S110; YES, shown in FIG. 5) (refer to "EJECTION ONTO EJECTING SUB-TRAY", shown in FIG. 14).

In this connection, since the paper sheet having ID=2 resides at the position on the conveyance path, being precedential to the positions of the paper sheet having ID=3 and the paper sheet having ID=4 at the time of the determination, the control section 101 determines as the first determination that it is impossible to eject the paper sheet having ID=3 and the paper sheet having ID=4 outside. Accordingly, the control section 101 controls the system so as to deactivates the operations for conveying the paper sheets, respectively having ID=3 and ID=4 (Step S106, shown in FIG. 5). In this case, the control section 101 displays a message that urges the user to manually remove the retention paper sheets, respectively having ID=3 and ID=4, on the operation display section 103.

On the other hand, as another controlling operation, it may be determined as the first determination that, if the paper sheet having ID=2 is ejected onto a sub-tray, it becomes possible to eject the concerned paper sheets outside (Step S105; YES, shown in FIG. 5). In this connection, since the paper sheet having ID=3 and the paper sheet having ID=4 resides at positions before the image forming operation is applied, the control section 101 determines as the second determination that the re-outputting operation is necessary (Step S107; YES, shown in FIG. 5). Then, the control section 101 determines that it is possible to eject the paper sheet having ID=3 and the paper sheet having ID=4 onto the ejecting sub-tray 290s serving as a separate tray (Step S109; YES, shown in FIG. 5). Accordingly, the control section 101 can control the system so as to eject the paper sheet having ID=3 and the paper sheet having ID=4 onto the ejecting sub-tray 290s serving as a separate tray (Step S110, shown in FIG. 5).

Successively, after the paper sheet having ID=2 has been ejected onto the ejecting sub-tray, when confirming with the sensors 107 that the retention paper sheets, respectively having ID=3 and ID=4, are removed, or when confirming with the sensors 107 that the paper sheets, respectively having ID=2 through ID=4, are ejected onto the sub-tray, the control section 101 resumes the processing so as to form the images, which were to be formed onto the paper sheets having IDs equal to or greater than 2, onto the other paper sheets having IDs equal to or greater than 5.

Thanks to the above-mentioned operation for ejecting the paper sheet having ID=2 onto the separate tray, it becomes easy for the user to remove the paper sheet having ID=2 that was tightly clipped by the pair of fixing rollers provided in the fixing unit 156. In addition, according to the above-mentioned operation for ejecting the paper sheet having ID=2 onto the separate tray, the paper sheet having ID=2 and the other normal paper sheets currently ejected onto the ejecting section 190 never be mingled together.

In this connection, if the above-mentioned operation for ejecting the paper sheet having ID=2 onto the separate tray, described as the fifth operating mode, is not applied, the paper sheet having ID=2 is still tightly clipped by the pair of fixing rollers provided in the fixing unit 156, and accordingly, it is difficult to remove the concerned paper sheet. On the other hand, if the paper sheet having ID=2 is ejected onto the designated tray without implementing the above-mentioned operation for ejecting the paper sheet having ID=2 onto the separate tray, the normal paper sheets and the concerned paper sheet are mingled together, resulting in a difficulty of discriminating them from each other.

As described in the above, on an occasion of forming an image onto a paper sheet, in a case where a certain abnormality is detected in the image to be formed or in the operation for conveying the paper sheet, and it is possible to select one of plural ejection openings when ejecting the paper sheet, and it is possible to eject the paper sheet and the re-outputting operation is necessary, the control section controls the system so as to eject the image-formed paper sheet through an ejection opening that is not designated. By controlling the system as above-mentioned, it becomes possible to prevent the retention paper sheet from remaining at an apparatus-inner position, from which it is difficult for the user to remove the retention paper sheet concerned. In addition, by controlling the system as above-mentioned, it becomes possible to prevent a page duplication caused by the mixture of the retention paper sheet and the successive paper sheets.

<Sixth Operating Mode>

Next, referring to the flowchart shown in FIG. 5 and the operation-status explanatory schematic diagrams shown in FIG. 15 and FIG. 16, the sixth operating mode in accordance with the embodiment of the present invention will be detailed in the following.

Figure 15:
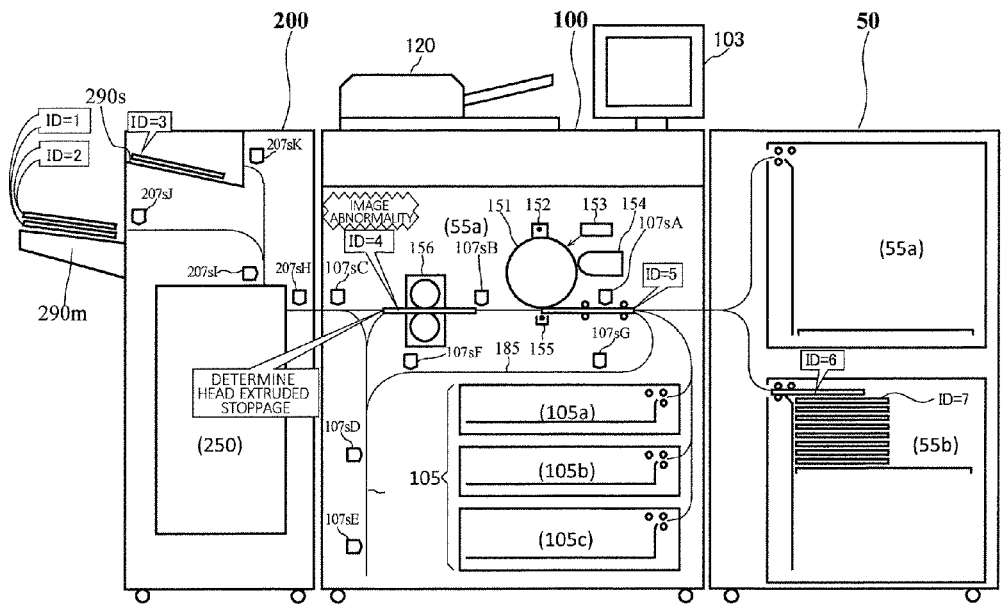
FIG. 15 is an explanatory schematic diagram showing an operation status of an embodiment in accordance with the present invention.

Herein, as indicated in the schematic diagram shown in FIG. 15, the image forming system, in which the paper sheet processing apparatus 200 is coupled to the image forming apparatus 100, is employed. In this image forming system, it is possible to eject the paper sheets onto the ejecting main-tray 290m and/or the ejecting sub-tray 290s. As indicated in the schematic diagram shown in FIG. 15, the single-sided image forming operation for six paper sheets respectively having IDs=1 through 6, which are respectively at the timings of the statuses indicated as follows, will be detailed in the following.

(6a) The two paper sheets, respectively having ID=1 and ID=2, are already ejected onto the ejecting main-tray 290m designated in advance. In this connection, the image forming operations for the two paper sheets, respectively having ID=1 and ID=2, were implemented as a job #1.

(6b) With respect to the four paper sheets respectively having ID=3 through ID=6, the ejecting sub-tray 290s is designated as the ejecting tray thereof. In this connection, the image forming operations for the four paper sheets, respectively having ID=1 through ID=6, are to be implemented as a job #2.

(6c) The paper sheet having ID=3 is processed by the paper sheet processing apparatus 200 after an image has been formed thereon by the image forming section 150, and then, is ejected onto the ejecting sub-tray 290s.

(6d) With respect to the paper sheet having ID=4, an image abnormality (for instance, a fixing temperature abnormality, etc.) is detected in midcourse of the fixing operation at the fixing unit 156 after an image has been formed thereon by the image forming section 150.

(6e) The paper sheet having ID=5 arrives at a position, just before the image forming section 150 applies the image forming operation thereto.

(6f) The paper sheet having ID=6 is about to be fed from the paper sheet feeding section 55b.

In this connection, since the paper sheet having ID=3 is already ejected outside, the concerned paper sheet is not at all the retention paper sheet. Accordingly, the control section 101 makes no determination with respect to the paper sheet having ID=3. With respect to the paper sheet having ID=4, the image abnormality has occurred. Accordingly, the control section 101 controls the system so as to immediately deactivate the operation for conveying the paper sheet having ID=4 (Step S101; NO, Step S102, shown in FIG. 5).

Further, with respect to the paper sheet having ID=4, since no retention paper sheet, currently residing at a preceding position, remains on the conveyance path, but the image abnormality has occurred, the control section 101 determines as the first determination that it is possible to eject the paper sheet having ID=4 outside, and also determines as the second determination that the re-outputting operation is necessary (Step S105; YES, Step S107; YES, shown in FIG. 5). Still further, since the ejecting main-tray 290m is currently occupied by the job #1, the control section 101 determines that it is impossible to eject the paper sheet having ID=4, which belongs to the job #2, outside. Accordingly, the control section 101 controls the system so as to make the paper sheet having ID=4 stop at the ejection opening of the ejecting sub-tray 290s designated in the state of the head extruded stoppage (Step S112 shown in FIG. 5).

Figure 16:
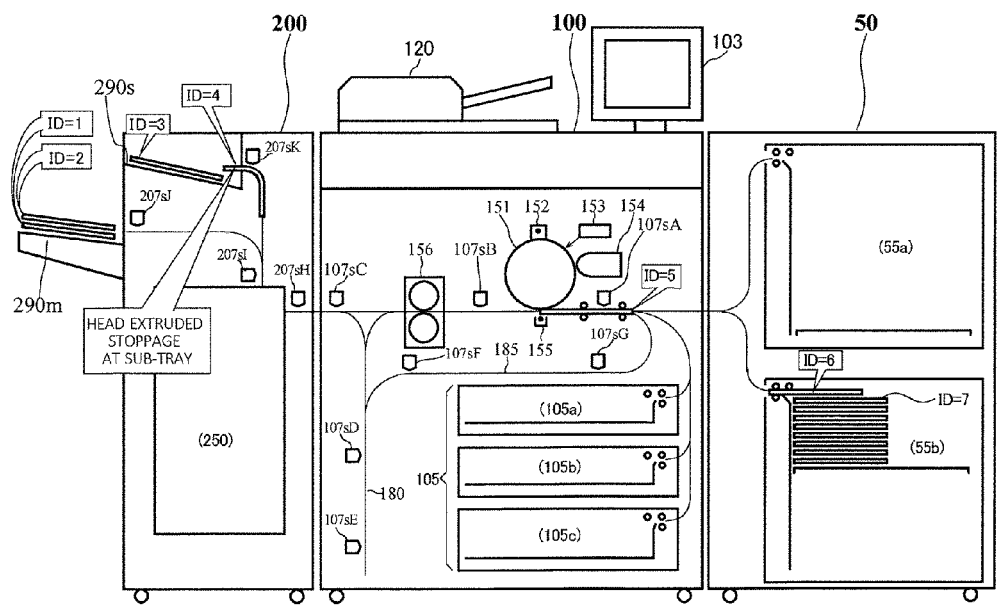
FIG. 16 is an explanatory schematic diagram showing an operation status of an embodiment in accordance with the present invention.

In this case, the control section 101 controls the conveyance section 110 so as to convey the paper sheet having ID=4, and then, deactivates the conveying operation at the time point when the conveyance time, being equivalent to the time for conveying, for instance, the half of the paper-sheet length, has elapsed, after the concerned paper sheet has passed through the sensor 107sC disposed in the vicinity of the ejection opening (refer to "HEAD EXTRUDED STOPPAGE AT SUB-TRAY" shown in FIG. 16).

In this connection, the control section 101 displays a message that urges the user to manually remove the paper sheet, having ID=4 and currently stopping in the state of the head extruded stoppage, and the retention paper sheets, respectively having ID=5 and ID=6, on the operation display section 103. Then, if the control section 101 has confirmed with the sensors 107 that the paper sheet, having ID=4 and currently stopping in the state of the head extruded stoppage, and the retention paper sheets, respectively having ID=5 and ID=6, were removed, the control section 101 controls the system so as to resume the processing for forming the images, which were to be formed onto the paper sheets having IDs equal to or greater than 4, onto the other paper sheets having IDs equal to or greater than 7.

According to the above-mentioned operation, the paper sheets, on which the normal images are respectively formed in order of ID=3, ID=7, . . . , are sequentially stacked onto the ejecting sub-tray 290s in this order. Further, thanks to the head extruded stoppage of the paper sheet having ID=4 as described in the above, it becomes easy for the user to remove the paper sheet having ID=4 that was tightly clipped by the pair of fixing rollers provided in the fixing unit 156. Still further, according to the head extruded stoppage of the paper sheet having ID=4 as described in the above, the paper sheet having ID=4 and the other normal paper sheets currently ejected onto the ejecting sub-tray 290s never be mingled together.

In this connection, if the head extruded stoppage, described as the sixth operating mode, is not applied, since the paper sheet having ID=4 is still tightly clipped by the pair of fixing rollers provided in the fixing unit 156, it is difficult to remove the paper sheet concerned. On the other hand, if the paper sheet having ID=4 is completely ejected onto the ejecting sub-tray 290s without employing the head extruded stoppage mode, the abnormal sheet and the other normal paper sheets are mingled together, and as a result, it becomes difficult to discriminate them from each other.

As described in the foregoing, on an occasion of forming an image onto a paper sheet, in a case where a certain abnormality is detected in the image to be formed on the paper sheet or in the operation for conveying the paper sheet, and it is possible to eject the paper sheet and the re-outputting operation is necessary, the control section controls the system so as not to completely eject the paper sheet from the ejection opening. By controlling the system as above-mentioned, even in a case where it is impossible to eject the concerned paper sheet onto a separate tray, it becomes possible to prevent the retention paper sheet from remaining at an apparatus-inner position, from which it is difficult for the user to remove the retention paper sheet concerned. In addition, by controlling the system as above-mentioned, even in a case where it is impossible to eject the concerned paper sheet onto a separate tray, it becomes possible to prevent a page duplication caused by the mixture of the retention paper sheet and the successive paper sheets.

<Embodiment Acquired from Each of Embodiments>

On an occasion of forming an image onto a paper sheet, in a case where a certain abnormality is detected in the image to be formed or in the operation for conveying the paper sheet, when it is impossible to eject the paper sheet, the control section deactivates the operation for conveying the paper sheet. Accordingly, it becomes possible to prevent the damage of each of sections from increasing. On the other hand, when it is possible to eject the paper sheet and the re-outputting operation is not necessary, the paper sheet is ejected outside through the ejection opening. According to this operation, it becomes possible to prevent the necessary page from dropping out. When it is possible to eject the concerned paper sheet and re-outputting operation is necessary, the control section controls the system so as not to completely eject the paper sheet from the ejection opening. By controlling the system as above-mentioned, even in a case where it is impossible to eject the concerned paper sheet onto a separate tray, it becomes possible to prevent the retention paper sheet from remaining at an apparatus-inner position, from which it is difficult for the user to remove the retention paper sheet concerned. Further, when it is possible to eject the paper sheet and the re-outputting operation is necessary, the control section controls the system so as not to completely eject the paper sheet from the ejection opening. By controlling the system as above-mentioned, even in a case where it is impossible to eject the concerned paper sheet onto a separate tray, it becomes possible to prevent a page duplication caused by the mixture of the retention paper sheet and the successive paper sheets.

When it is possible to eject the paper sheet and the re-outputting operation is necessary, the control section 101 controls the system so as to deactivate the conveying operation in such a state that the concerned paper sheet is ejected up to a mid-way position of the paper sheet from the ejection opening. By controlling the system as above-mentioned, even in a case where it is impossible to eject the concerned paper sheet onto a separate tray, it becomes possible to prevent the retention paper sheet from remaining at an apparatus-inner position, from which it is difficult for the user to remove the retention paper sheet concerned. Further, When it is possible to eject the paper sheet and the re-outputting operation is necessary, the control section 101 controls the system so as to deactivate the conveying operation in such a state that the concerned paper sheet is ejected up to a mid-way position of the paper sheet from the ejection opening. By controlling the system as above-mentioned, even in a case where it is impossible to eject the concerned paper sheet onto a separate tray, it becomes possible to prevent a page duplication caused by the mixture of the retention paper sheet and the successive paper sheets.

Only for the leading paper sheet, for which the ejecting operation is possible and the re-outputting operation is necessary, the control section controls the system so as to deactivate the conveying operation in such a state that the concerned paper sheet is ejected up to a mid-way position of the paper sheet from the ejection opening.

By controlling the system as above-mentioned, even in a case where it is impossible to eject the concerned paper sheet onto a separate tray, it becomes possible to prevent the retention paper sheet from remaining at an apparatus-inner position, from which it is difficult for the user to remove the retention paper sheet concerned. Further, only for the leading paper sheet, for which the ejecting operation is possible and the re-outputting operation is necessary, the control section controls the system so as to deactivate the conveying operation in such a state that the concerned paper sheet is ejected up to a mid-way position of the paper sheet from the ejection opening. By controlling the system as above-mentioned, even in a case where it is impossible to eject the concerned paper sheet onto a separate tray, it becomes possible to prevent a page duplication caused by the mixture of the retention paper sheet and the successive paper sheets.

On an occasion of forming an image onto a paper sheet, in a case where it is possible to select one of plural ejection openings when ejecting the paper sheet, and it is possible to eject the paper sheet and the re-outputting operation is necessary, the control section controls the system so as to eject the image-formed paper sheet outside through an ejection opening that is not designated. By controlling the system as above-mentioned, it becomes possible to prevent the retention paper sheet from remaining at an apparatus-inner position, from which it is difficult for the user to remove the retention paper sheet concerned. Further, on an occasion of forming an image onto a paper sheet, in a case where it is possible to select one of plural ejection openings when ejecting the paper sheet, and it is possible to eject the paper sheet and the re-outputting operation is necessary, the control section controls the system so as to eject the image-formed paper sheet outside through an ejection opening that is not designated. By controlling the system as above-mentioned, it becomes possible to prevent a page duplication caused by the mixture of the retention paper sheet and the successive paper sheets.

Corresponding to the contents of the abnormality detected by the abnormality detecting section, the control section controls the system so as to temporarily deactivate the image forming operation to be implemented by the image forming section and the conveying operation to be implemented by the conveyance section. By controlling the system as above-mentioned, it becomes possible to heighten the safety aspects of the image forming operation and the conveying operation.

In a case where the abnormality detected by the abnormality detecting section relates to the image formed by the image forming section, the control section controls the system so as to deactivate the image forming operation to be implemented by the image forming section and the conveying operation to be implemented by the conveyance section, more rapidly than in a case where the abnormality relates to the conveying operation implemented by the conveyance section. By controlling the system as above-mentioned, it becomes possible to heighten the safety aspects of the image forming operation and the conveying operation, while maintaining the safety aspects in an appropriate state.

<Other Embodiments>

In the embodiment described in the foregoing, the image forming apparatus 100 that is provided with the single ejecting tray 190*m*, and the image forming system that is provided with the two ejecting trays, including the ejecting main-tray 290*m* and the ejecting sub-tray 290*s*, have been exemplified as the concrete examples. However, the scope of the present invention is not limited to the concrete examples aforementioned. Modifications and additions made by a skilled person without departing from the spirit and scope of the invention shall be included in the scope of the present invention.

In this connection, the configuration of the image forming apparatus or the image forming system, indicated as the embodiment of the present invention in the foregoing, is merely an example among various kinds of variations. In other words, even in such a configuration that includes a plurality of image forming apparatuses and/or a plurality of paper sheet processing apparatuses or the like, by applying the processing described in the foregoing, it becomes possible to acquire a favorable result.

Further, it is possible to apply the processing, described in the foregoing, even to such a configuration in which an ejecting section is provided in both the image forming apparatus 100 and the paper sheet processing apparatus 200, or such another configuration in which each of plural paper-sheet processing apparatuses is provided with the ejecting section.

What is claimed is:

1. An image forming apparatus comprising:
   an image forming section that forms an image onto a paper sheet;
   a conveyance section that conveys the paper sheet corresponding to an image forming operation, and ejects an image-formed paper sheet outside through an ejection opening;
   a position detecting section that detects a position of the paper sheet or the image-formed paper sheet, which is conveyed on a conveyance path of the conveyance section;
   an abnormality detecting section that detects an abnormality in the image forming apparatus, the abnormality being at least one of an image abnormality in the image formed on the image-formed paper sheet or a conveyance abnormality in a conveying operation by the conveyance section; and
   a control section that controls the image forming operation and the conveying operation, based on results detected by the position detecting section and the abnormality detecting section;
   wherein the control section is configured to determine as a first determination whether or not it is possible for the conveyance section to eject retention paper sheets currently remaining within the image forming apparatus according to contents of the abnormality and the position with respect to the retention paper sheets when the abnormality detecting section detects the abnormality, to determine as a second determination whether or not it is necessary to form the image onto a new paper sheet so as to re-output a new image-formed paper sheet according to the contents of the abnormality and the position with respect to the retention paper sheets when the abnormality detecting section detects the abnormality, and to control the image forming operation and the conveying operation based on results of the first determination and the second determination, and
   a plurality of retention paper sheets are retained within the image forming apparatus, and when the abnormality detecting section detects the abnormality, at least one of the first determination or the second determination is performed for each of the retention paper sheets retained in the image forming apparatus,
   wherein the control section is configured to conduct controlling operations of: deactivating an operation for conveying each of the retention paper sheets remaining within the image forming apparatus, when determining as the first determination that it is impossible to elect any one of the paper sheets and/or the image-formed paper sheets outside;
   ejecting each of the retention paper sheets, remaining within the image forming apparatus, outside through the election opening, when determining as the first determination that it is possible to eject each of the paper sheets and/or the image-formed paper sheets outside and determining as the second determination that it is unnecessary to re-output the new image-formed paper sheet; and
   incompletely ejecting each of the retention paper sheets, remaining within the image forming apparatus, outside from the election opening, when determining as the first determination that it is possible to eject each of the paper sheets and/or the image-formed paper sheets outside and determining as the second determination that it is necessary to re-output the new image-formed paper sheet, in such a manner that a leading part of the paper sheets is extruded from the ejection opening.

2. The image forming apparatus of claim 1,
   wherein, when determining as the first determination that it is possible to eject each of the paper sheets and/or the image-formed paper sheets outside and determining as the second determination that it is necessary to re-output the new image-formed paper sheet, the control section controls the conveyance section so as to deactivate the conveying operation in such a state that each of the paper sheets and/or the image-formed paper sheets is ejected up to a mid-way position thereof from the ejection opening.

3. The image forming apparatus of claim 2,
   wherein, when determining as the first determination that it is possible to eject each of the paper sheets and/or the image-formed paper sheets outside and determining as the second determination that it is necessary to re-output the new image-formed paper sheet, the control section controls the conveyance section so as to deactivate the conveying operation in such a state that only a leading paper sheet among the paper sheets and/or the image-formed paper sheets is ejected up to a mid-way position thereof from the ejection opening.

4. The image forming apparatus of claim 1,
   wherein, in a case where it is possible to select one of plural ejection openings when ejecting the paper sheet or the image-formed paper sheet,
   when determining as the first determination that it is possible to eject each of the paper sheets and/or the image-formed paper sheets outside and determining as the second determination that it is necessary to re-output the new image-formed paper sheet, the control section controls the conveyance section so as to eject the image-formed paper sheet outside through an ejection opening that is not designated in regard to the image-formed paper sheet.

5. The image forming apparatus of claim 1,
   wherein, according to contents of the abnormality detected by the abnormality detecting section, the control section conducts controlling operations for temporarily deactivating the image forming operation to be implemented by the image forming section and the conveying operation to be implemented by the conveyance section.

6. The image forming apparatus of claim 5,
   wherein, in a case where the abnormality detecting section detects the image abnormality, the control section conducts the controlling operations so as to deactivate the image forming operation to be implemented by the image forming section and the conveying operation to be implemented by the conveyance section, more rapidly than in a case where the abnormality detecting section detects the conveyance abnormality.

7. An image forming control method performed in an image forming apparatus including an image forming section that forms an image onto a paper sheet, a conveyance section that conveys the paper sheet corresponding to an image forming operation and ejects an image-formed paper sheet outside through an ejection opening, a position detecting section that detects a position of the paper sheet or the image-formed paper sheet which is conveyed on a conveyance path of the conveyance section, an abnormality detecting section that detects an abnormality in the image forming apparatus, the abnormality being at least one of image abnormality in the image formed on the image-formed paper sheet or a conveyance abnormality in a conveying operation for conveying the paper sheet or the image-formed paper sheet, and a control section that controls the image forming operation and the conveying operation based on results detected by the position detecting section and the abnormality detecting section, the control section configured to determine as a first determination whether or not it is possible for the conveyance section to eject retention paper sheets currently remaining within the image forming apparatus according to contents of the abnormality and the position with respect to the retention paper sheets when the abnormality detecting section detects the abnormality, to determine as a second determination whether or not it is necessary to form the image onto a new paper sheet so as to re-output a new image-formed paper sheet according to the contents of the abnormality and the position with respect to the retention paper sheets when the abnormality detecting section detects the abnormality, and to control the image forming operation and the conveying operation based on results of the first determination and the second determination, the image forming controlling method by the control section comprising the steps of:

detecting the abnormality by the abnormality detecting section, when the abnormality detecting section detects the abnormality, performing at least one of the first determination or the second determination for each of a plurality of retention paper sheets retained in the image forming apparatus, deactivating an operation for conveying each of the retention paper sheets remaining within the image forming apparatus, when determining as the first determination that it is impossible to elect any one of the paper sheets and/or the image-formed paper sheets outside;

ejecting each of the retention paper sheets, remaining within the image forming apparatus, outside through the election opening, when determining as the first determination that it is possible to eject each of the paper sheets and/or the image-formed paper sheets outside and determining as the second determination that it is unnecessary to re-output the new image-formed paper sheet; and incompletely ejecting each of the retention paper sheets, remaining within the image forming apparatus, outside from the ejection opening, when determining as the first determination that it is possible to elect each of the paper sheets and/or the image-formed paper sheets outside and determining as the second determination that it is necessary to re-output the new image-formed paper sheet, in such a manner that a leading part of the paper sheets is extruded from the ejection opening.

8. The image forming control method of claim 7, wherein, when determining as the first determination that it is possible to eject each of the paper sheets and/or the image-formed paper sheets outside and determining as the second determination that it is necessary to re-output the new image-formed paper sheet, ejecting each of the paper sheets and/or the image-formed paper sheets up to a mid-way position of each the paper sheets and/or the image-formed paper sheets from the ejection opening.

9. The image forming control method of claim 8, wherein, when determining as the first determination that it is possible to eject each of the paper sheets and/or the image-formed paper sheets outside and determining as the second determination that it is necessary to re-output the new image-formed paper sheet, ejecting only a leading paper sheet among the paper sheets and/or the image-formed paper sheets up to a mid-way position of the leading paper sheet from the ejection opening.

10. The image forming control method of claim 7, further comprising the step of:

wherein, in a case where it is possible to select one of plural ejection openings when ejecting the paper sheet or the image-formed paper sheet, when determining as the first determination that it is possible to eject each of the paper sheets and/or the image-formed paper sheets outside and determining as the second determination that it is necessary to re-output the new image-formed paper sheet, ejecting the image-formed paper sheet outside through an ejection opening that is not designated in regard to the image-formed paper sheet.

11. The image forming control method of claims 7, further comprising the step of:

temporarily deactivating the image forming operation to be implemented by the image forming section and the conveying operation to be implemented by the conveyance section, according to contents of the abnormality, detected by the abnormality detecting section.

12. The image forming control method of claim 11 further comprising the step of:

wherein, in a case where the abnormality detecting section detects the image abnormality, deactivating the image forming operation to be implemented by the image forming section and the conveying operation to be implemented by the conveyance section, more rapidly than in a case where the abnormality detecting section detects the conveyance abnormality.

13. An image forming apparatus comprising:

an image forming section that forms an image onto a paper sheet;

a conveyance section that conveys the paper sheet corresponding to an image forming operation, and ejects an image-formed paper sheet outside through an ejection opening;

a position detecting section that detects a position of the paper sheet or the image-formed paper sheet, which is conveyed on a conveyance path of the conveyance section;

an abnormality detecting section that detects an image abnormality in the image formed on the image-formed paper sheet or a conveyance abnormality in a conveying operation by the conveyance section; and a control section that controls the image forming operation and the conveying operation, based on results detected by the position detecting section and the abnormality detecting section;

wherein the control section is configured to determine as a first determination whether or not it is possible for the conveyance section to eject each of retention paper sheets currently remaining within the image forming apparatus according to contents of the image abnormality and/or the conveyance abnormality and the position with respect to each of the retention paper sheets when the abnormality detecting section detects the image abnormality and/or the conveyance abnormality, to determine as a second determination whether or not it is necessary to form the image onto a new paper sheet so as to re-output a new image-formed paper sheet according to the contents of the image abnormality and/or the conveyance abnormality and the position with respect to each of the retention paper sheets when the abnormality detecting section detects the image abnormality and/or the conveyance abnormality, and to control the image forming operation and the conveying operation based on results of the first determination and the second determination, and wherein the control section is configured to conduct controlling operations of:

deactivating an operation for conveying each of the retention paper sheets remaining within the image forming apparatus, when determining as the first determination that it is impossible to eject any one of the paper sheets and/or the image-formed paper sheets outside;

ejecting each of the retention paper sheets, remaining within the image forming apparatus, outside through the ejection opening, when determining as the first determination that it is possible to eject each of the paper sheets and/or the image-formed paper sheets outside and determining as the second determination that it is unnecessary to re-output the new image-formed paper sheet; and incompletely ejecting each of the retention paper sheets, remaining within the image forming apparatus, outside from the ejection opening, when determining as the first determination that it is possible to eject each of the paper sheets and/or the image-formed paper sheets outside and determining as the second determination that it is necessary to re-output the new image-formed paper sheet;

wherein, when determining as the first determination that it is possible to eject each of the paper sheets and/or the image-formed paper sheets outside and determining as the second determination that it is necessary to re-output the new image-formed paper sheet, the control section controls the conveyance section so as to deactivate the conveying operation in such a state that each of the paper sheets and/or the image-formed paper sheets is ejected up to a mid-way position thereof from the ejection opening; and wherein, when determining as the first determination that it is possible to eject each of the paper sheets and/or the image-formed paper sheets outside and determining as the second determination that it is necessary to re-output the new image-formed paper sheet, the control section controls the conveyance section so as to deactivate the conveying operation in such a state that only a leading paper sheet among the paper sheets and/or the image-formed paper sheets is ejected up to a mid-way position thereof from the ejection opening.

14. An image forming control method performed in an image forming apparatus including an image forming section that forms an image onto a paper sheet, a conveyance section that conveys the paper sheet corresponding to an image forming operation and ejects an image-formed paper sheet outside through an ejection opening, a position detecting section that detects a position of the paper sheet or the image-formed paper sheet which is conveyed on a conveyance path of the conveyance section, an abnormality detecting section that detects an image abnormality in the image formed on the image-formed paper sheet or a conveyance abnormality in a conveying operation for conveying the paper sheet or the image-formed paper sheet, and a control section that controls the image forming operation and the conveying operation based on results detected by the position detecting section and the abnormality detecting section, the control section configured to determine as a first determination whether or not it is possible for the conveyance section to eject each of retention paper sheets currently remaining within the image forming apparatus according to contents of the image abnormality and/or the conveyance abnormality and the position with respect to each of the retention paper sheets when the abnormality detecting section detects the image abnormality and/or the conveyance abnormality, to determine as a second determination whether or not it is necessary to form the image onto a new paper sheet so as to re-output a new image-formed paper sheet according to the contents of the image abnormality and/or the conveyance abnormality and the position with respect to each of the retention paper sheets when the abnormality detecting section detects the image abnormality and/or the conveyance abnormality, and to control the image forming operation and the conveying operation based on results of the first determination and the second determination, the image forming controlling method by the control section comprising the steps of:

deactivating an operation for conveying each of the retention paper sheets remaining within the image forming apparatus, when determining as the first determination that it is impossible to eject any one of the paper sheets and/or the image-formed paper sheets outside;

ejecting each of the retention paper sheets, remaining within the image forming apparatus, outside through the ejection opening, when determining as the first determination that it is possible to eject each of the paper sheets and/or the image-formed paper sheets outside and determining as the second determination that it is unnecessary to re-output the new image-formed paper sheet; and incompletely ejecting each of the retention paper sheets, remaining within the image forming apparatus, outside from the ejection opening, when determining as the first determination that it is possible to eject each of the paper sheets and/or the image-formed paper sheets outside and determining as the second determination that it is necessary to re-output the new image-formed paper sheet;

wherein, when determining as the first determination that it is possible to eject each of the paper sheets and/or the image-formed paper sheets outside and determining as the second determination that it is necessary to re-output the new image-formed paper sheet, ejecting each of the paper sheets and/or the image-formed paper sheets up to a mid-way position of each the paper sheets and/or the image-formed paper sheets from the ejection opening; and wherein, when determining as the first determination that it is possible to eject each of the paper sheets and/or the image-formed paper sheets outside and determining as the second determination that it is necessary to re-output the new image-formed paper sheet, ejecting only a leading paper sheet among the paper sheets and/or the image-formed paper sheets up to a mid-way position of the leading paper sheet from the ejection opening.

* * * * *